United States Patent [19]

Nakajima

[11] Patent Number: 5,715,139
[45] Date of Patent: Feb. 3, 1998

[54] PORTABLE ELECTRONIC APPARATUS HAVING A FRAME SUPPORTING FUNCTIONAL COMPONENTS, AND METHOD OF ASSEMBLING THE PORTABLE ELECTRONIC APPARATUS

[75] Inventor: Yuji Nakajima, Tokyo, Japan

[73] Assignee: Kabushiki Kaisha Toshiba, Japan

[21] Appl. No.: 281,653

[22] Filed: Jul. 28, 1994

[30] Foreign Application Priority Data

Sep. 9, 1993 [JP] Japan ................................ 5-224369
Nov. 26, 1993 [JP] Japan ................................ 5-296945

[51] Int. Cl.$^6$ .......................... G06F 1/16; H05K 9/00
[52] U.S. Cl. ................................. 361/683; 361/818
[58] Field of Search .................. 364/708.1; 395/156, 395/168, 169, 905; 312/223.2; 361/680–687, 725, 816, 818

[56] References Cited

U.S. PATENT DOCUMENTS

| | | | |
|---|---|---|---|
| 4,742,478 | 5/1988 | Nigro, Jr. et al. | 361/680 |
| 4,864,469 | 9/1989 | Boudon | 361/685 |
| 5,136,466 | 8/1992 | Remise et al. | 361/685 |
| 5,136,468 | 8/1992 | Wong et al. | 361/683 |
| 5,224,019 | 6/1993 | Wong et al. | 361/685 |
| 5,237,486 | 8/1993 | LaPointe et al. | 361/681 |
| 5,269,598 | 12/1993 | Liu | 312/223.2 |
| 5,301,132 | 4/1994 | Akahane | 364/708.1 |
| 5,306,079 | 4/1994 | Liu | 312/223.2 |
| 5,422,784 | 6/1995 | Wakahara et al. | 361/680 |

FOREIGN PATENT DOCUMENTS 2071381  1/1993  Canada.

OTHER PUBLICATIONS

"Incredible Shrinking Computers", IEEE Spectrum, 8045, No.5, May, 1991, pp. 37–41.

*Primary Examiner*—Michael W. Phillips
*Attorney, Agent, or Firm*—Cushman Darby & Cushman Intellectual Property Group of Pillsbury Madison & Sutro, LLP

[57] ABSTRACT

A portable electronic apparatus has a housing and a frame incorporated within the housing. A lower half of the housing has a bottom wall and first wall extending upwardly from the bottom wall. The first wall defines a first receptacle for containing a first functional component in said lower half. The frame has a second wall opposing the first wall. The second wall defines a second receptacle for containing a second functional component within said frame. The second wall further defines a third receptacle for containing a third functional component within the lower half along with the first wall.

17 Claims, 27 Drawing Sheets

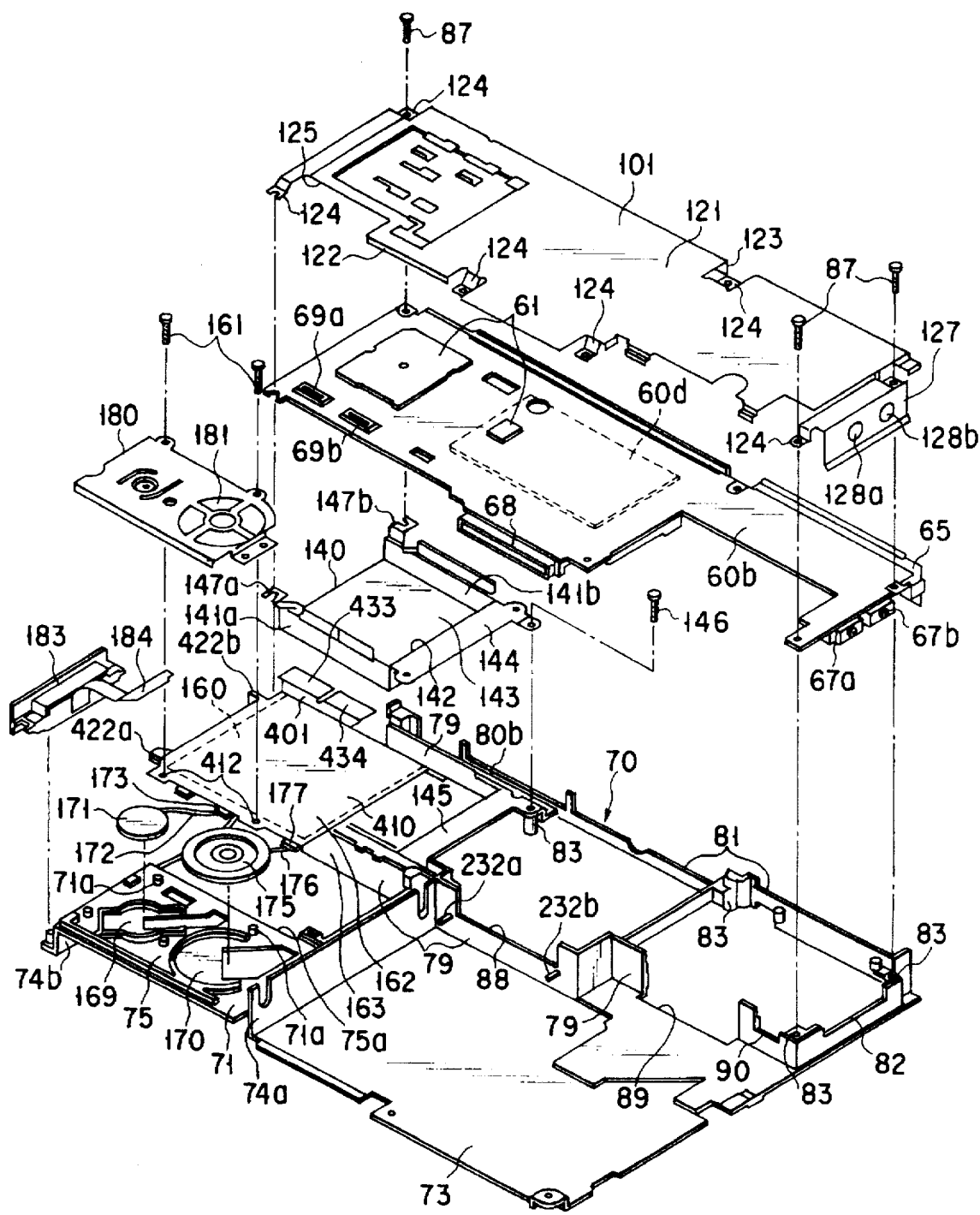
F I G. 12

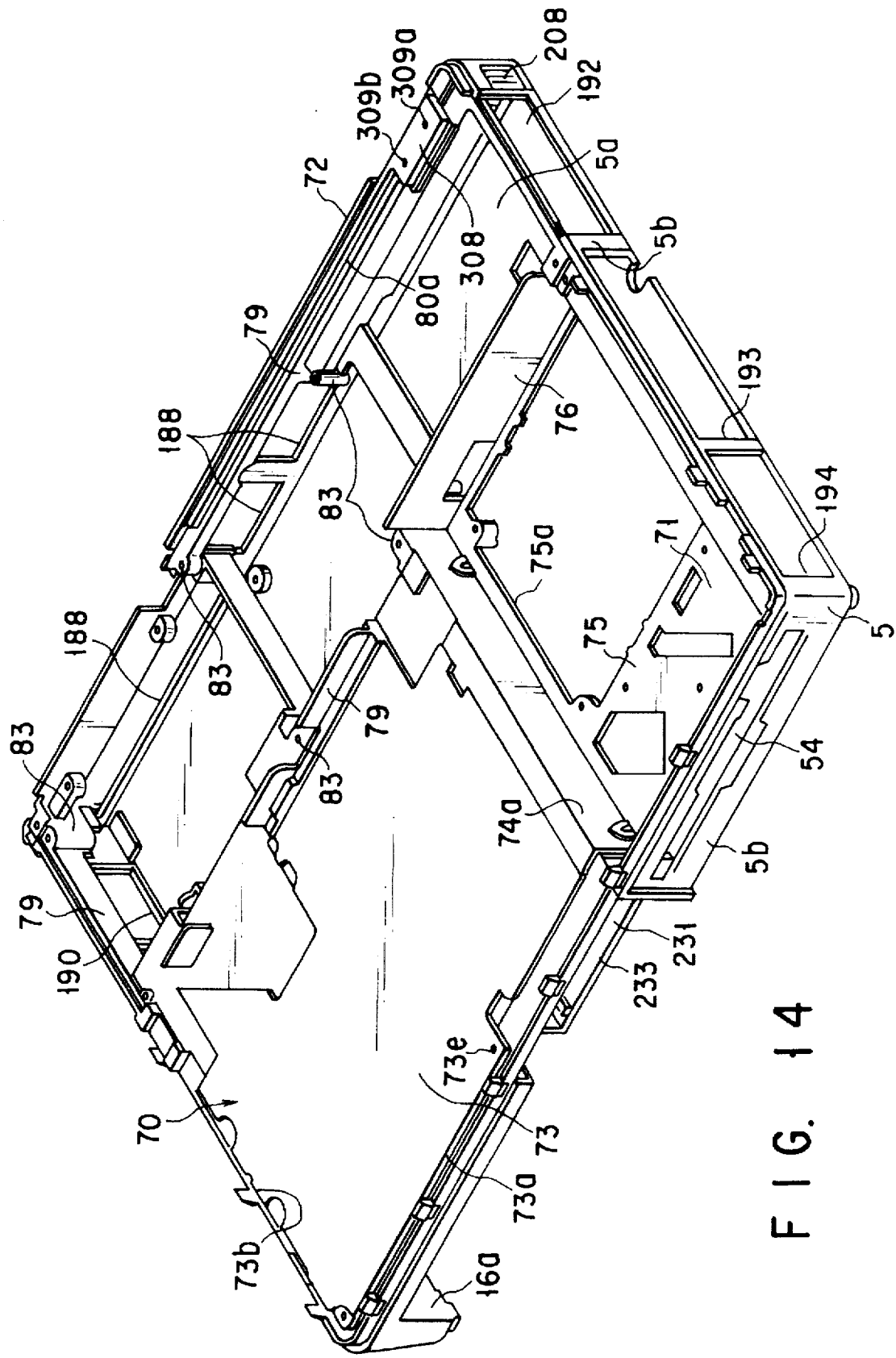
F I G. 14

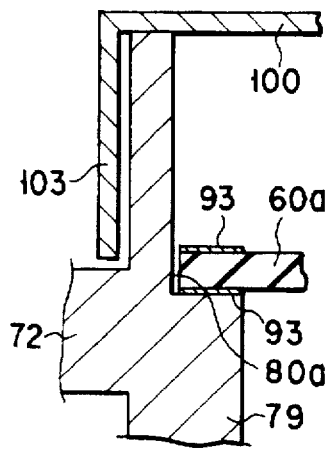
F I G. 20
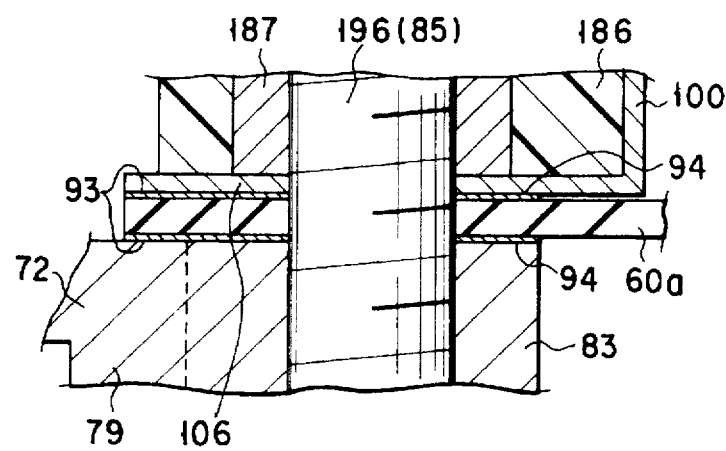
F I G. 21
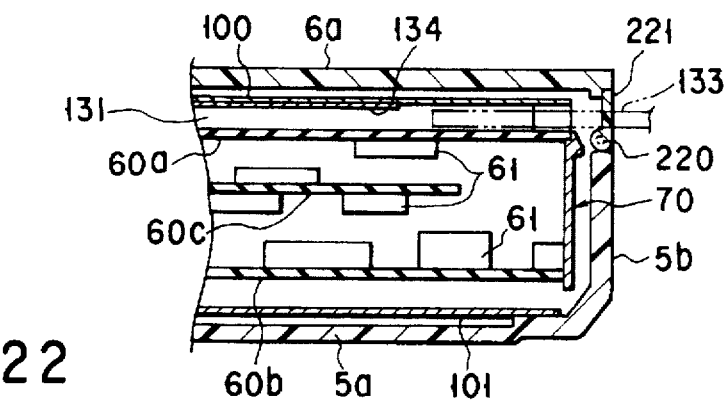
F I G. 22
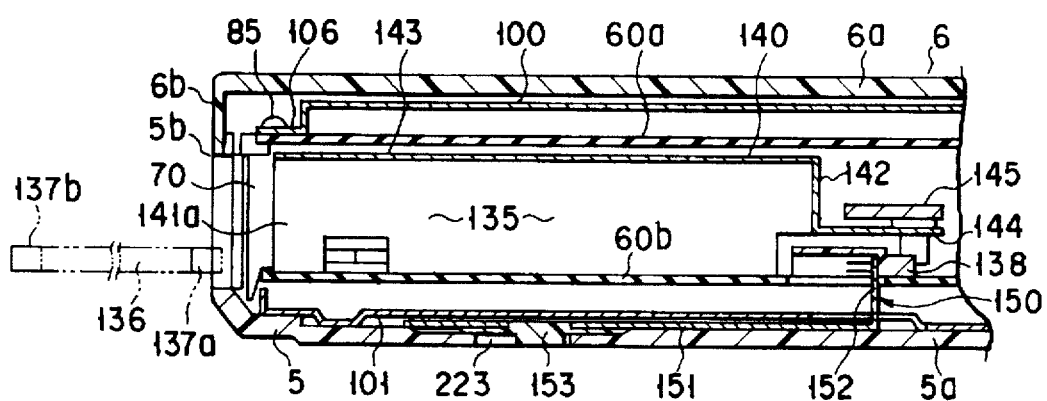
F I G. 23

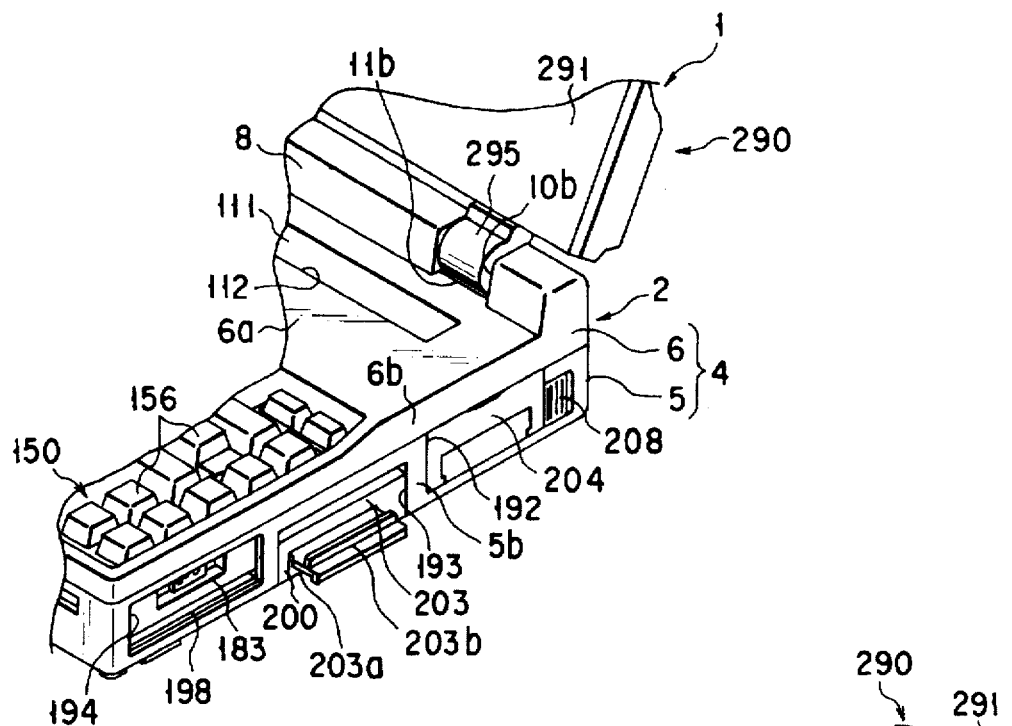
FIG. 32
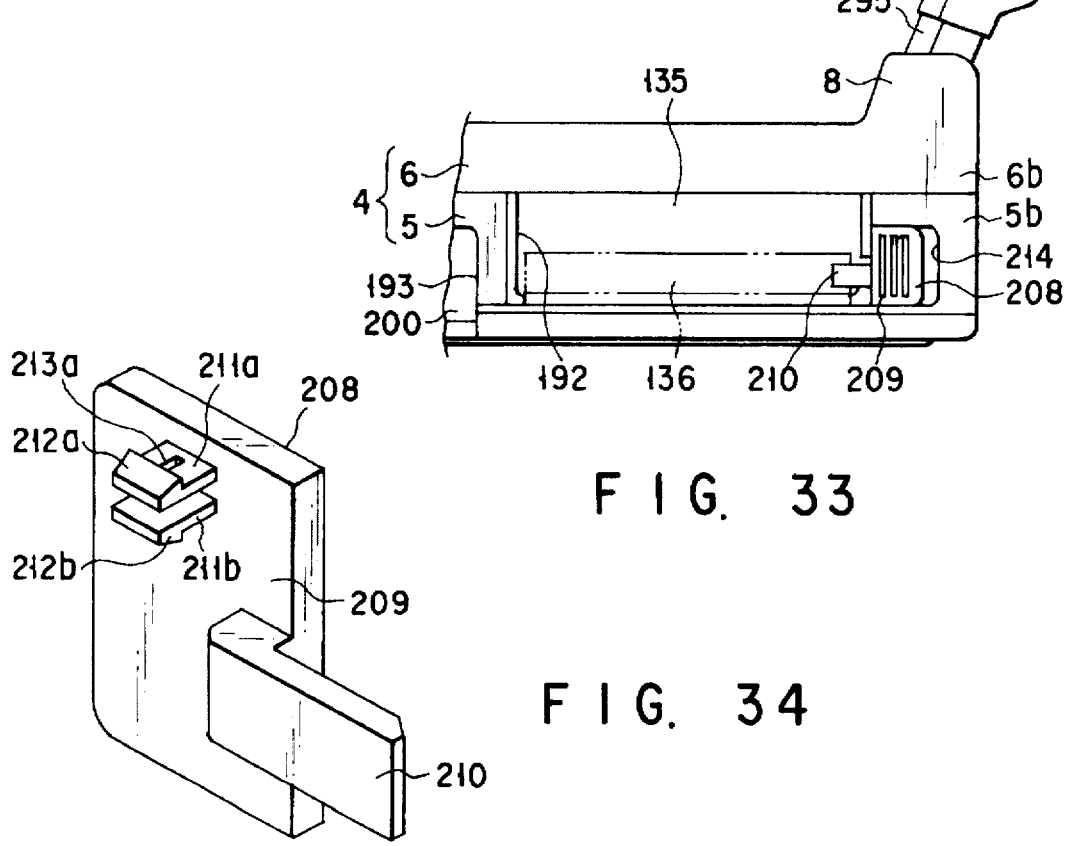
FIG. 33
FIG. 34

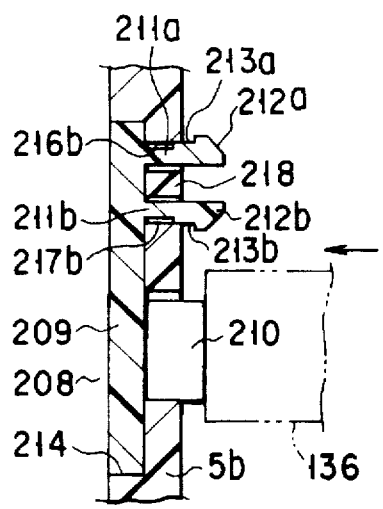 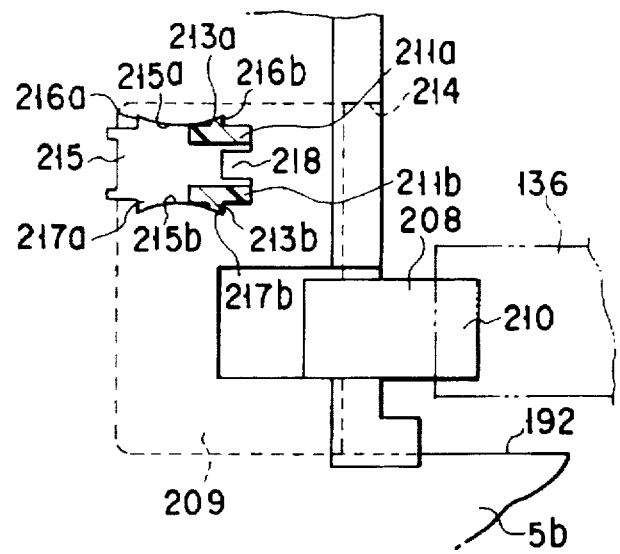
FIG. 35A  FIG. 35B
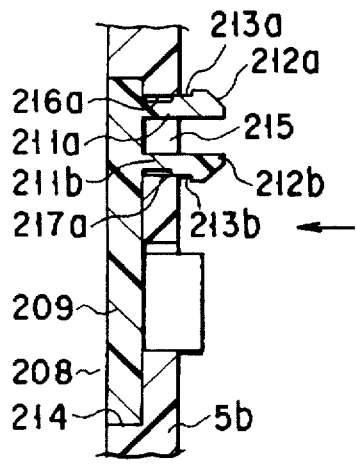 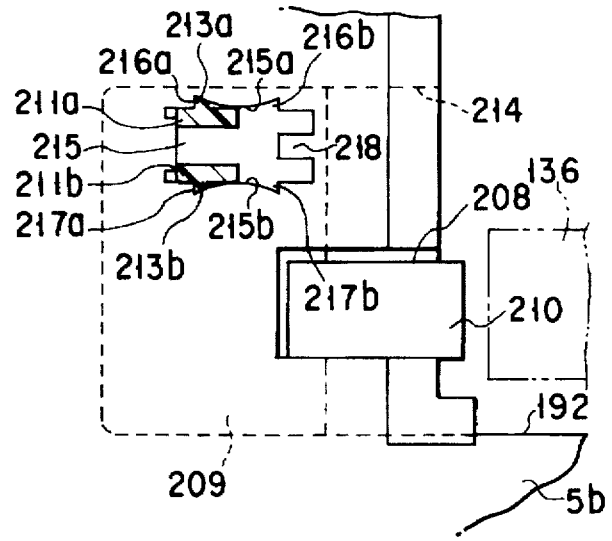
FIG. 36A  FIG. 36B

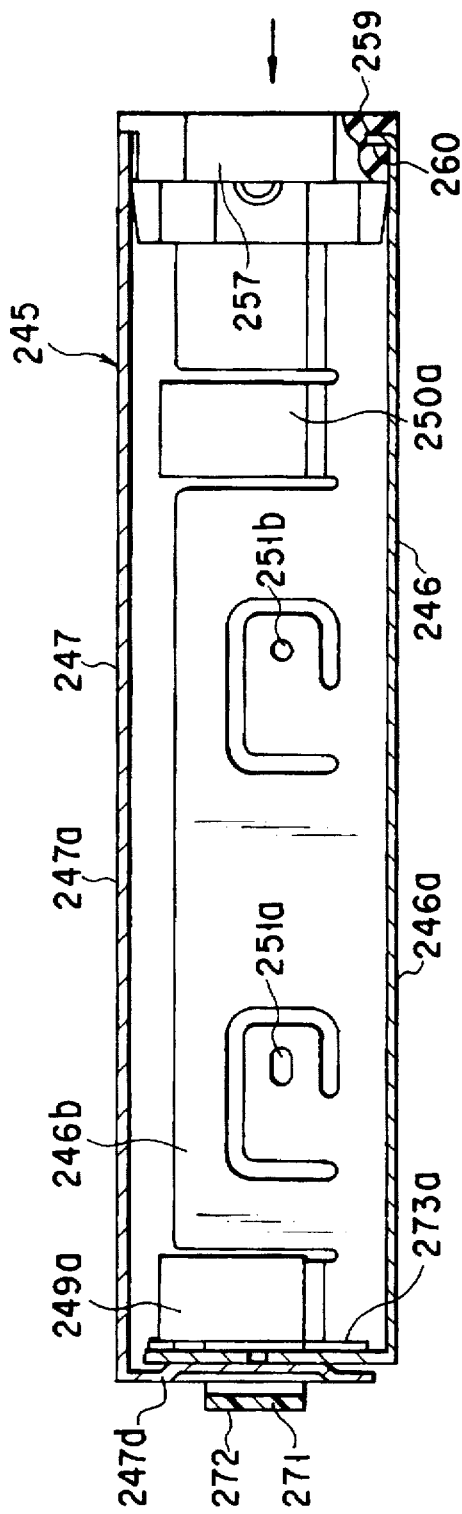
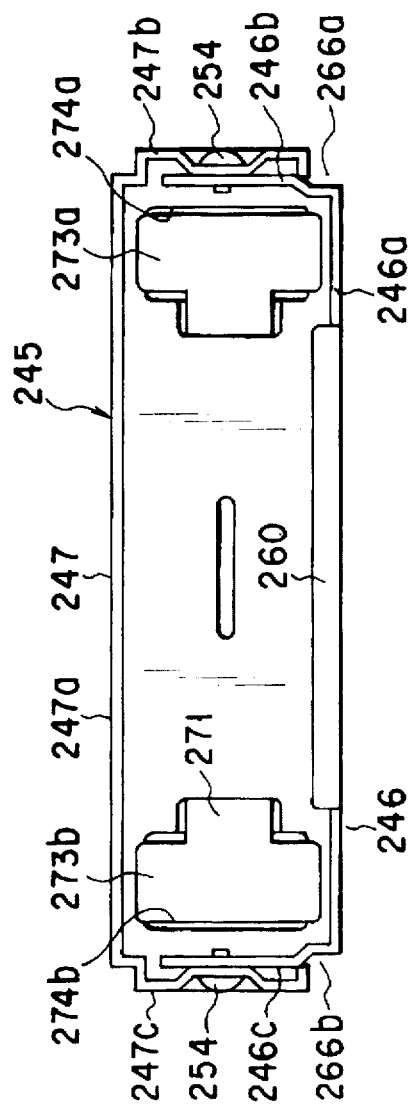
FIG. 40
FIG. 41

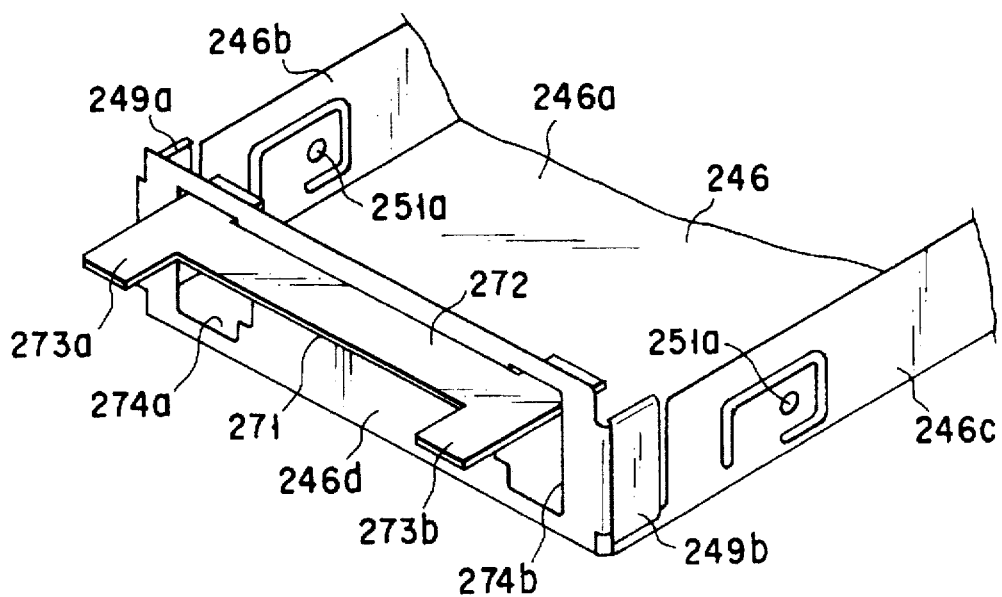
F I G. 42
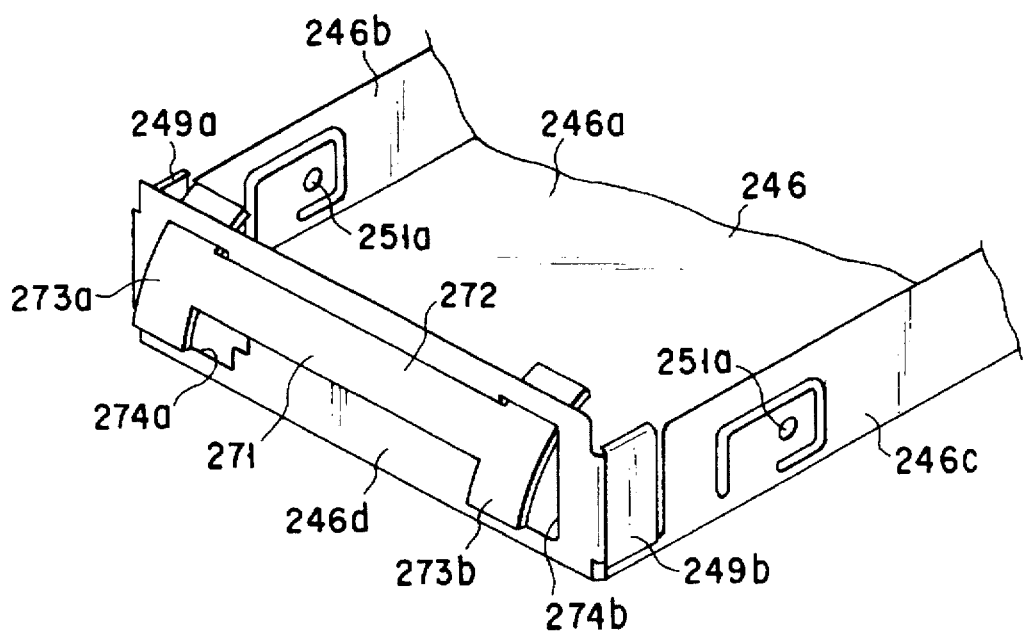
F I G. 43

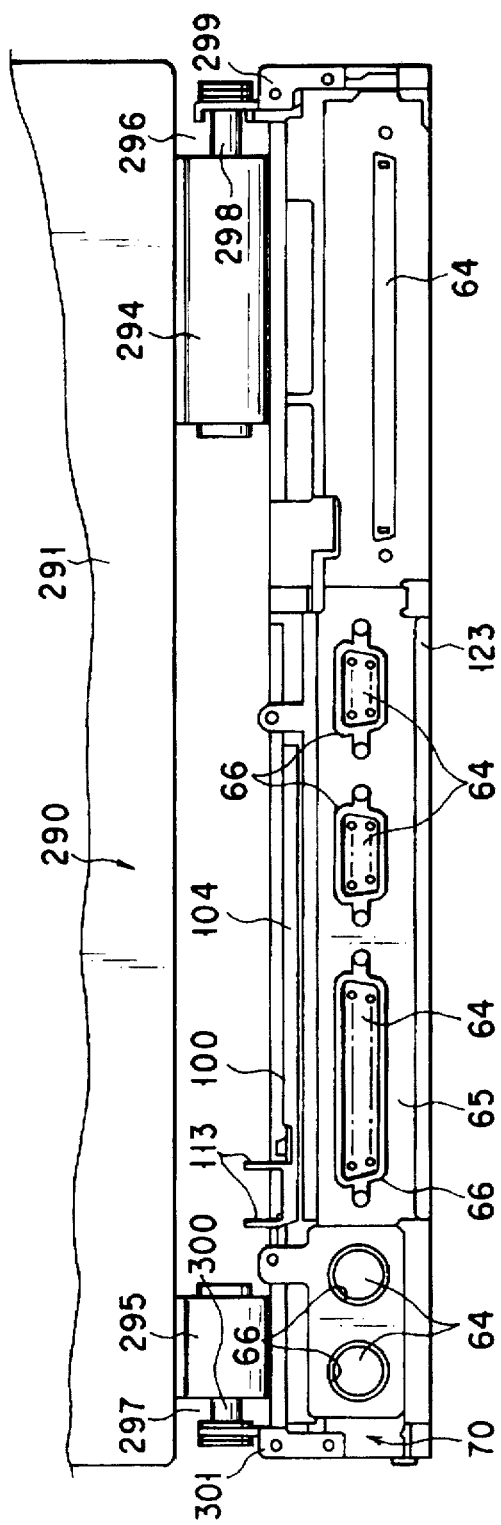
FIG. 44
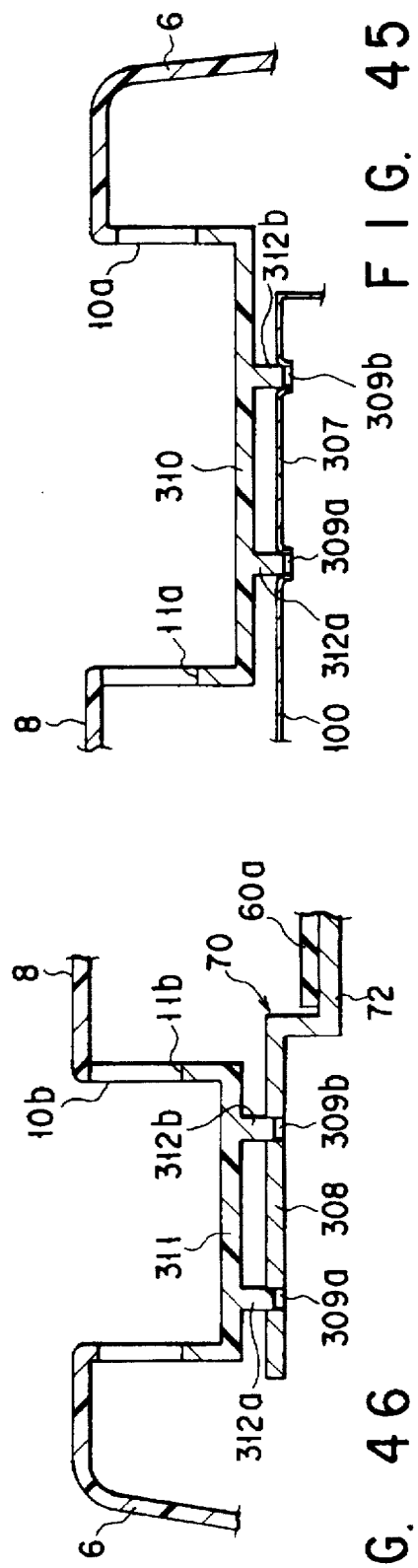
FIG. 45
FIG. 46

PORTABLE ELECTRONIC APPARATUS HAVING A FRAME SUPPORTING FUNCTIONAL COMPONENTS, AND METHOD OF ASSEMBLING THE PORTABLE ELECTRONIC APPARATUS

BACKGROUND OF THE INVENTION

1. Field of the Invention

The present invention relates to a portable electronic apparatus having a box-shaped housing which contains circuit boards, each having circuit parts mounted on it, and various functional components such as a floppy disk drive and extension connectors, and also relates to a method of assembling this portable electronic apparatus.

2. Description of the Related Art

Recently, a variety of book-type and notebook-type portable computers have been produced. Each of these computers comprises a box-shaped base unit, a keyboard attached to the base unit and a display unit which is a flat panel hinged to the base unit.

The base unit of a portable computer of this type comprises a box-like housing made of synthetic resin. The housing contains circuit boards, each with various circuit parts mounted on it, and also functional components such as a floppy disk drive and extension connectors. The circuit boards and the functional components are located on the bottom wall of the housing and fastened thereto by screws at predetermined positions.

In the conventional portable computer, the circuit boards and functional components are discrete parts, each fastened to the housing by screws. Inevitably it requires considerable time and labor to incorporate these parts into the housing. The efficiency of assembling the portable computer is therefore low. Particularly low is the efficiency of assembling a portable computer of which the housing is small. The housing is small, and the space in the housing is limited. The internal components are densely packed in the limited amount of space available, with little space between. A circuit board and a functional component overlap at portions where they are fastened by screws to a wall of the housing. In most cases, an object such as a finger or a tool can hardly have easy access into positions deep in the housing. This is one of the major obstacles to efficient assembly of portable computers. Moreover, to remove a functional component or a circuit board from a position deep in the housing, many parts surrounding the component or board must be removed, one after another. Consequently, considerable time and labor is also required in achieving inspection and maintenance of a portable computer, as well.

The bottom wall of the housing described above needs to have a number of bosses, at prescribed positions where functional components and circuit boards can be fastened to the bottom wall by screws. The space within the housing is reduced by the volume of the bosses. To secure a sufficient space within, the housing must then be made larger, making it difficult for the computer to be as compact as is desired. Some more improvement should therefore be made in this respect.

The housing of the conventional portable computer contains and supports many functional components and circuit boards. To stably support them, the housing must be made up of thick walls. The thicker the housing walls, the more difficult it is to make the computer as light and compact as desired.

SUMMARY OF THE INVENTION

In view of the foregoing, an object of the present invention is to provide a portable electronic apparatus which is easy to assemble by securing, circuit boards and functional components within a housing, and which is easy to overhaul when removing, at a time, the circuits boards and the functional components from the housing, and also to provide a method of assembling this portable electronic apparatus.

Another object of the invention is to provide a portable electronic apparatus having a housing which is comparatively small and yet provides a space large enough to arrange internal components with ease, which is simple in its internal structure, and which renders the apparatus as a whole lightweight and serves to reduce the manufacturing cost of the apparatus.

Still another object of this invention is to provide a portable electronic apparatus having a housing from which noise is prevented from leaking, thereby minimizing the influence of electric waves on apparatuses placed near the portable electronic apparatus.

Another object of the invention is to provide a portable electronic apparatus in which functional components are held securely and which is made lightweight.

A further object of this invention is to provide a portable electronic apparatus having a housing which is designed such that a pack-shaped component can easily be incorporated into it and removed from it.

To attain the above-mentioned objects, according to the present invention there is provided a portable electronic apparatus which comprises: a housing comprised of a lower half having a bottom wall and an upper half removably connected to the lower half; a circuit board contained in the housing; functional components contained in the housing; and a frame supporting the circuit board and the functional components and removably set within the housing.

The circuit board and the functional components are attached to the frame, forming a unit, before the frame is incorporated into the housing. Hence, they are set into the housing at a time when the frame is incorporated into the housing. Neither the circuit board nor the functional components need to be fastened by screws to the bottom wall of the lower half.

Since the circuit board and the functional components are fastened to the frame, they can be removed together from the housing, merely by taking the frame out of the housing. Hence, to remove the circuit board and the functional components from the housing, it is unnecessary to remove the parts surrounding the circuit board and the functional components, one after another, even if the functional components and the circuit board are located deep in the housing. The electronic apparatus can be overhauled with ease.

According to this invention there is provided a method of assembling a portable electronic apparatus which comprises a housing comprised of a lower half having a bottom wall and an upper half removably connected to the lower half, a circuit board contained in the housing, functional components contained in the housing, and a frame supporting the circuit board and the functional components and removably set within the housing. The method comprises the steps of: fastening the circuit board and the functional components to the frame; inserting the frame including the circuit board and the functional components, into the lower half; mounting the upper half on the lower half containing the frame, thereby covering the frame, the circuit board and the functional components, and fastening the lower half and the upper half by means of screws.

In this method, the circuit board and the functional components are attached to the frame, forming a unit, before the frame is incorporated into the housing. They are, therefore, set into the housing together when the frame is incorporated into the housing. Neither the circuit board nor the functional components needs to be fastened by screws to the bottom wall of the lower half.

Since the circuit board and the functional components are fastened to the frame, they can be removed together from the housing, only by taking the frame out of the housing. To remove the circuit board and the functional components from the housing, there is no need to remove the parts surrounding the circuit board and the functional components, one after another, even if the functional components and the circuit board are located deep in the housing. It is easy to overhaul the electronic apparatus.

According to the invention there is provided another portable electronic apparatus which comprises: a housing comprised of a lower half having a bottom wall and an upper half removably connected to the lower half and having a top all opposing the bottom wall; a frame removably incorporated in the housing; and first and second functional components supported by the frame and incorporated in the housing. The frame has a first supporting section supporting the first functional component and a second supporting section supporting the second functional component, the first and second supporting sections are arranged side by side in a plane between the lower half and the upper half, and the frame has walls having upper edges above and lower edges below the first and second functional components.

Since the first and second functional components are supported by the first and second supporting sections, respectively, they can be incorporated together into the housing, merely by setting the frame into the housing. For the same reason, they can be removed together from the housing, only by taking the frame out of the housing.

Having two supporting sections, the frame can firmly support the first and second functional components. Since the housing need not support the first functional component or the second functional component, it needs only to cover the frame and the functional components. In other words, the housing need not be rigid or strong; it can be made lightweight and can yet provide a sufficient space.

Even if forces are exerted on the housing from above and below, they are received by the frame. No damaging pressure or impact is applied onto the functional components. In addition, the walls of the frame support the housing from within, reinforcing the housing.

According to the invention there is provided still another portable electronic apparatus which comprises: a housing made of a synthetic resin and comprised of a lower half having a bottom wall and four side walls contiguous with the bottom wall and having a plurality of openings, and an upper half removably connected to the lower half and covering the lower half; a frame made of metal, having substantially the same size as the lower half, and removably fitted in the lower half; a plurality of functional components supported by the frame and incorporated in the housing and exposed through the openings; and a plurality of connectors supported by the frame, incorporated in the housing and exposed through the openings.

Since the functional components and the connectors are supported by the frame, the housing made of a synthetic resin needs only to function as a cover for the frame and the functional components. The housing is strong enough for a cover, though it has many openings in its side walls.

According to the invention there is provided another portable electronic apparatus which comprises: a frame made of metal; a plurality of functional components removably supported by the frame; and a cover made of a synthetic resin, covering the frame and the functional components and comprised of a lower half having a bottom wall and four side walls contiguous with the bottom wall and having a plurality of openings, and an upper half removably connected to the lower half and covering the lower half.

Since the functional components are supported by the frame, the housing made of a synthetic resin needs only to function as a cover for the frame and the functional components. The housing is strong enough for a cover, though it has many openings in its side walls. The functional components can be firmly held within the housing.

According to the invention there is provided a further portable electronic apparatus which comprises: a housing comprised of a side wall having an insertion port and a bottom wall continuous with the side wall, the side wall and the bottom wall defining a receptacle communicating with the insertion port; a pack-shaped component set in the receptacle, removable from the receptacle through the insertion port and having an end oppose the insertion port and a handle secured to the end; and a cover removably attached to the insertion port.

When the cover is removed, the insertion port is opened, through which the handle of the pack-shaped component is exposed. A user can then have an access to the handle, and can easily remove the pack-shaped component from the receptacle, merely by holding the handle and pulling it.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 12 is an exploded view, showing the frame positioned upside-down with respect to its position shown in FIG. 11, and explaining how to incorporate the circuit boards, the second shield plate and the functional components into the frame;

FIG. 14 is a perspective view, showing the lower housing and the frame fitted in the lower housing;

FIG. 20 is a sectional view, showing the board-supporting section of the frame and a portion of the first circuit board supported by the section;

FIG. 21 is a sectional view explaining how the first circuit board and the frame are fastened by screws to the upper housing;

FIG. 22 is a sectional view showing the first card receptacle formed in the housing;

FIG. 23 is a sectional view showing the second card receptacle formed in the housing;

FIG. 32 is a perspective view of the right part of the portable computer;

FIG. 33 is a right-side view of the portable computer;

FIG. 34 is a perspective view showing the card stopper mounted on the right side of the portable computer;

FIG. 35A is a sectional view, showing the card stopper slid to the first position;

FIG. 35B is a side view of the card stopper looked at in the direction of the arrow shown in FIG. 35A;

FIG. 36A is a sectional view, showing the card stopper slid to the second position;

FIG. 36B is a side view of the card stopper looked at in the direction of the arrow shown in FIG. 36A;

FIG. 40 is a sectional view of the protective case;

FIG. 41 is a rear view of the protective case, looked at in the direction of the arrow shown in FIG. 40;

FIG. 42 is a perspective view of the protective case, showing engagement portions inserted in the engagement holes of the protective case;

FIG. 43 is a perspective view of the protective case, showing the handle rotated downwards with its engagement portions inserted in the engagement holes of the protective case;

FIG. 44 is a rear view of the computer, showing the display unit connected to the frame by the hinge mechanism;

FIG. 45 is a sectional view of the first cover attached to the housing;

FIG. 46 is a sectional view of the second cover attached to the housing; and

DETAILED DESCRIPTION OF THE PREFERRED EMBODIMENTS

A book-type portable computer, which is an embodiment of the invention, will be described with reference to the accompanying drawings.

Figure 1:
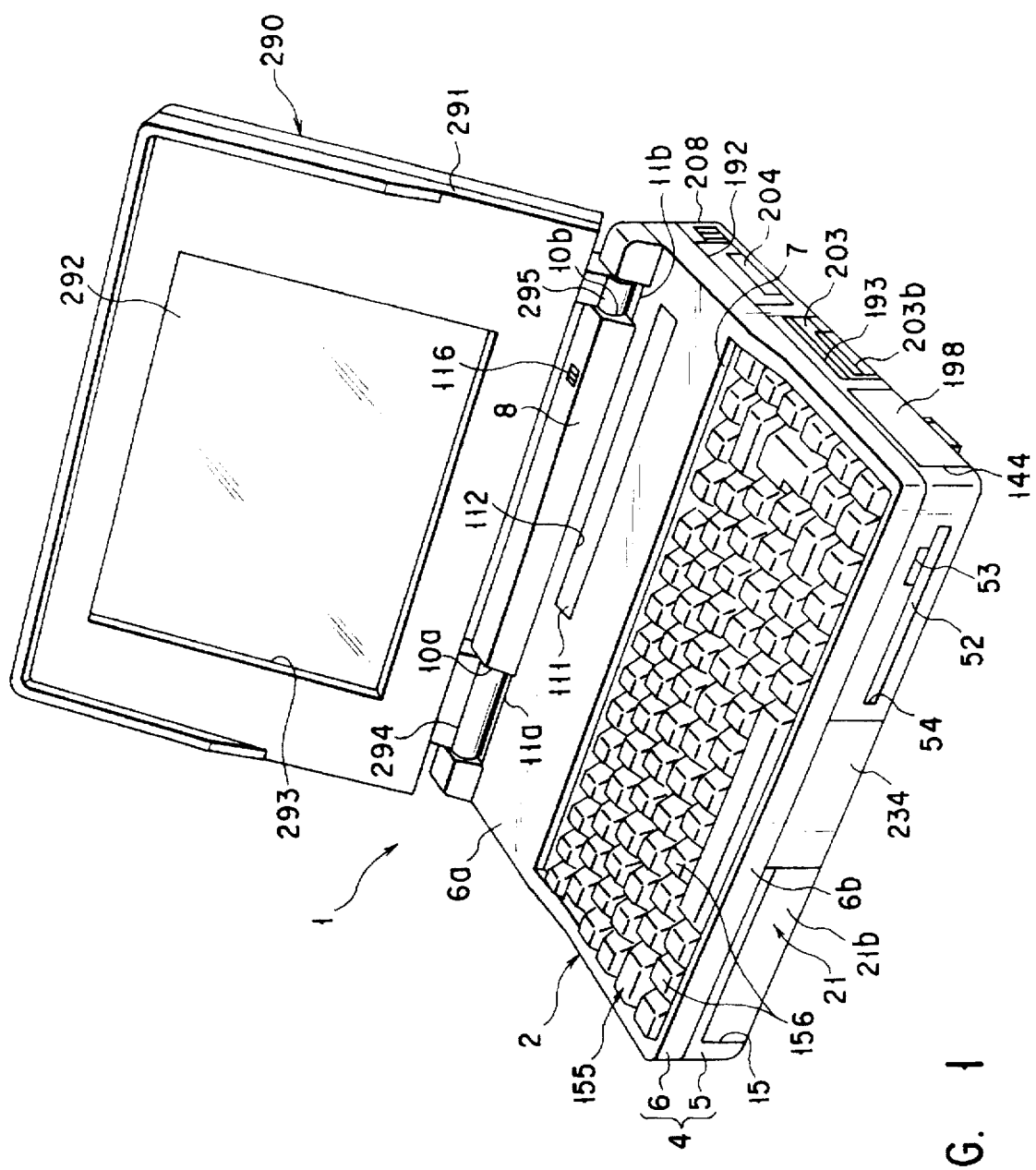
FIG. 1 is a perspective view of a book-type portable computer which is an embodiment of the present invention.

FIG. 1 is a perspective view of the book-type portable computer 1 which has the size of an A4 paper sheet. The computer 1 comprises a base unit 2 which has a housing 4 shaped like a rectangular box. The housing 4 comprises a lower half 5 (hereinafter called "lower housing") and an upper half 6 (hereinafter called "upper housing"). The upper housing 6 is removably mounted on the lower housing 5. Both the lower housing 5 and the upper housing 6 are made of a synthetic resin such as ABS resin. Their inner surfaces are covered with plated layers (not shown) which operate as shields.

Figure 4:
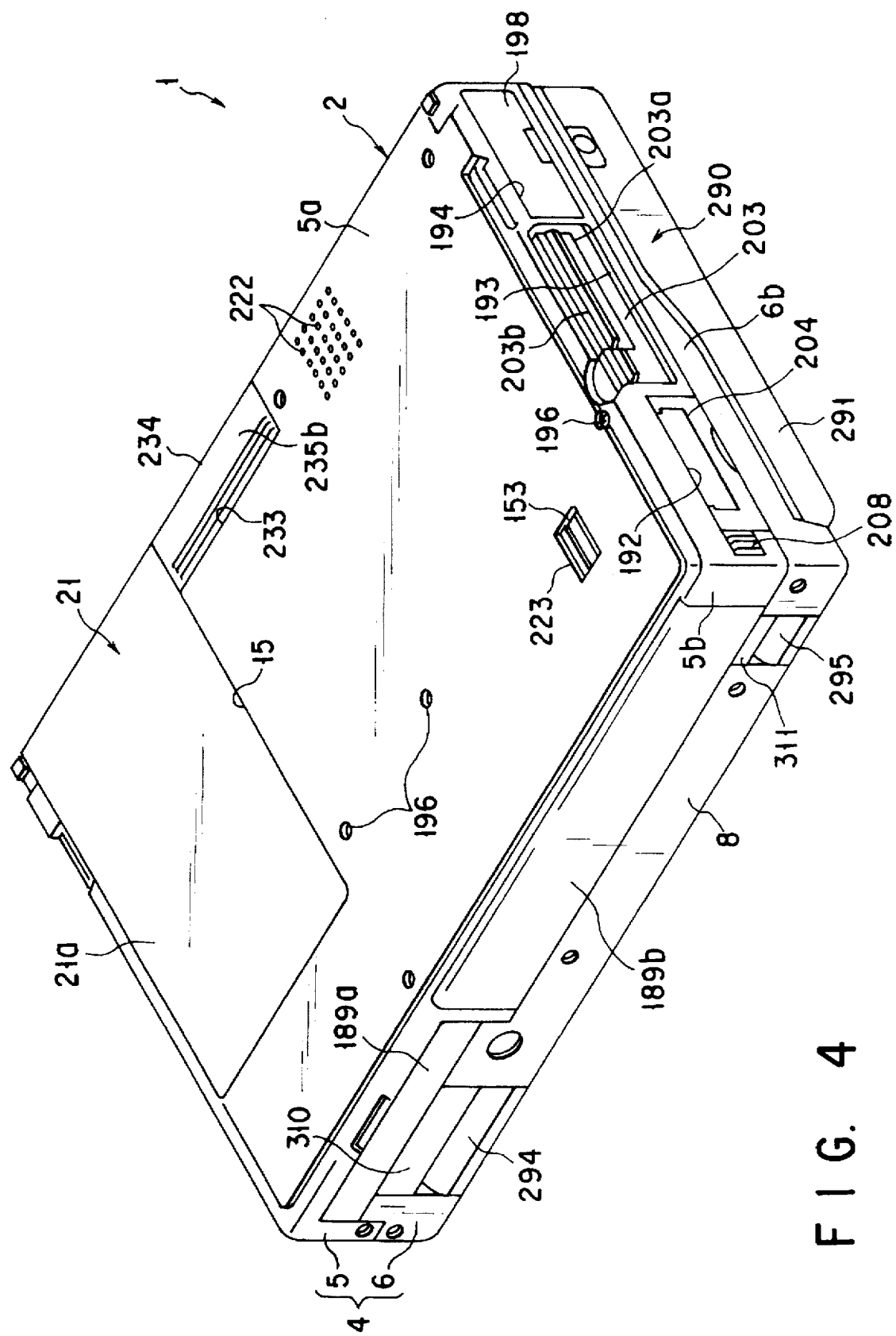
FIG. 4 is a perspective view of the computer, looked at from below and showing the bottom thereof.
Figure 13:
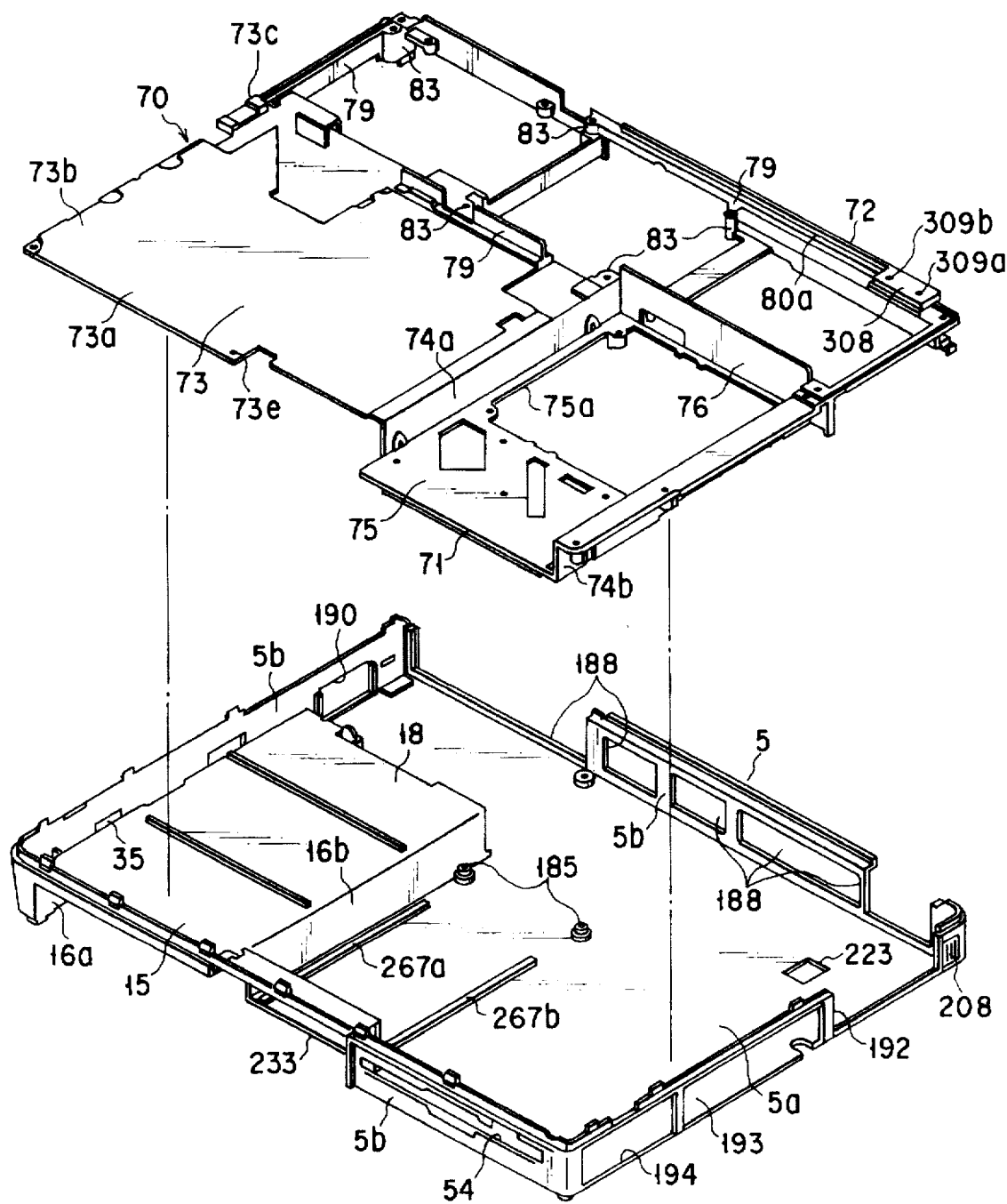
FIG. 13 is an exploded view, showing the lower housing and the upper housing spaced apart.

As shown in FIG. 4 and 13, the lower housing 5 has a flat rectangular bottom wall 5a and four side walls 5b extending from the sides of the bottom wall 5a. The upper housing 6 has a substantially flat top wall 6a and four side walls 6b extending from the sides of the top wall 6a. The side walls 6b of the upper housing 6 are flush with the corresponding side walls 5b of the lower housing 5. The side walls 5b and 6b define the front, right and left sides and back of the housing 4.

As shown in FIG. 1, the top wall 6a of the upper housing 6 has a rectangular opening 7 in its front half, through which a keyboard is exposed outward. The opening 7 is as large as the front half of the top wall 6a. The top wall 6a has a hollow raised section 8 at the rear end. The raised section 8 is as wide as the upper housing 6. The section 8 has two leg-holding recesses 10a and 10b in the left and right portions, respectively. The leg-holding recesses 10a and 10b opens at the front, top and rear of the raised section 8. The leg-holding recesses 10a and 10b have an opening 11a and an opening 11b, respectively, both communicating with the interior of the housing 4.

Figure 5:
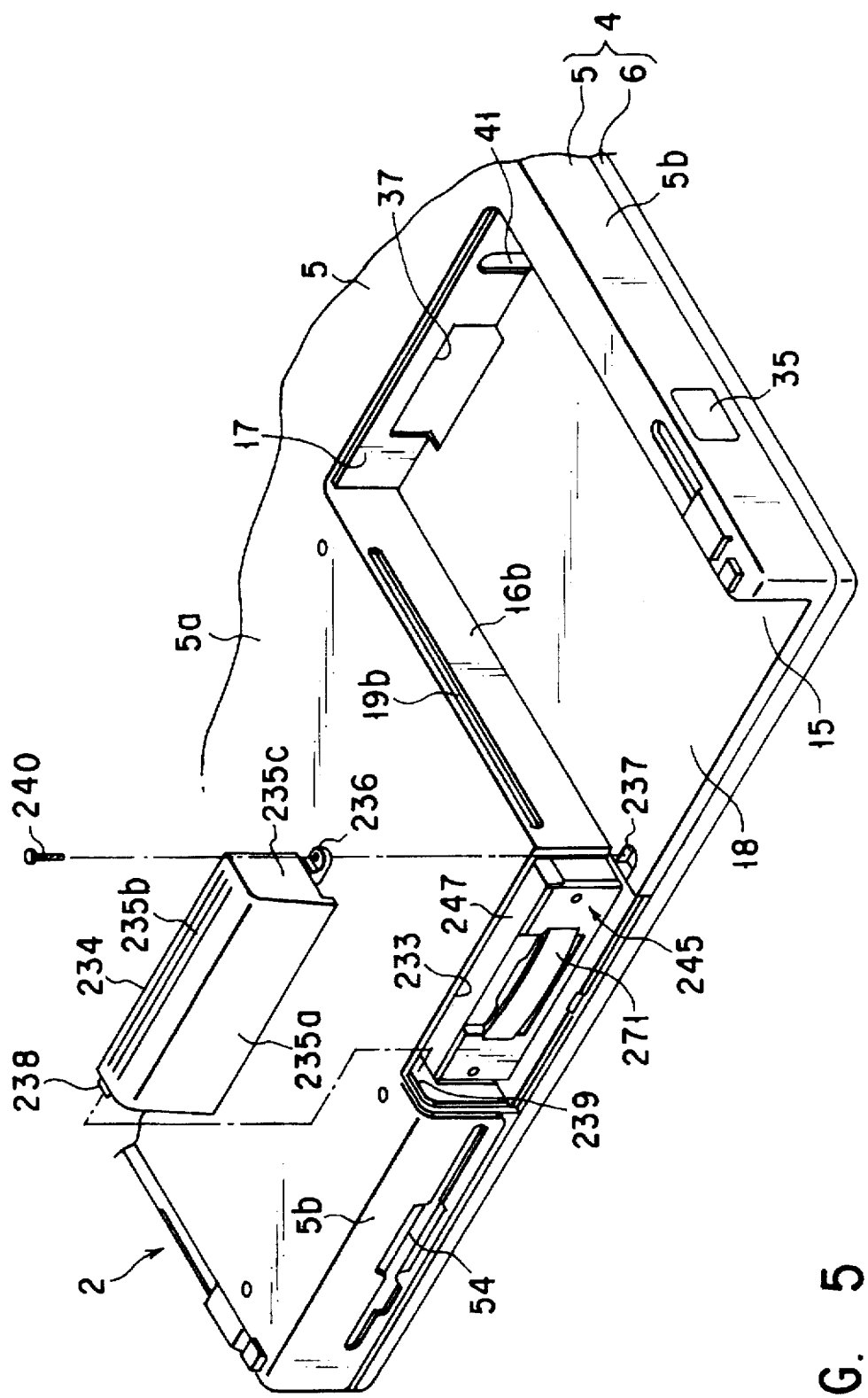
FIG. 5 is a perspective view of the lower housing of the computer containing an HDD, looked at from below, illustrating the positional relation between the lower housing and the HDD cover.

As shown in FIG. 5, the lower housing 5 has a battery receptacle 15 in the front-left portion. The battery receptacle 15 opens at the front and bottom of the lower housing. The receptacle 15 is defined by the left and right side walls 16a and 16b, a rear wall 17 connecting the side walls 16a and 16b, and a top wall 18 extending between the upper edges of the walls 16a, 16b and 17. The walls 16a, 16b, 17 and 18 partition the battery receptacle 15 from the interior of the lower housing 5. The side walls 16a and 16b have guide projections 19a and 19b, respectively. Both projections 19a and 19b extend between the front and back of the battery receptacle 15.

A battery pack 21 is removably set in the battery receptacle 15. The battery pack 21 is a rechargeable one which serves as a power supply for driving the computer 1 when the computer 1 is used in a place where no any commercial power supply is available. The battery pack 21 can be removed from the battery receptacle 15, at the front of the lower housing 5. The pack 21 has two guide grooves formed in its right and left sides. The guide grooves receive the guide projections 19a and 19b of the receptacle 15 as long as the battery pack 21 remains inserted in the receptacle 15. The pack 21 is thereby held within the battery receptacle 15. Once the battery pack 21 has been inserted into the receptacle 15, the bottom 21a and front 21b of the battery pack 21 are set level with the bottom 5a and front of the lower housing 5, respectively, as is illustrated in FIG. 4.

Figure 6:
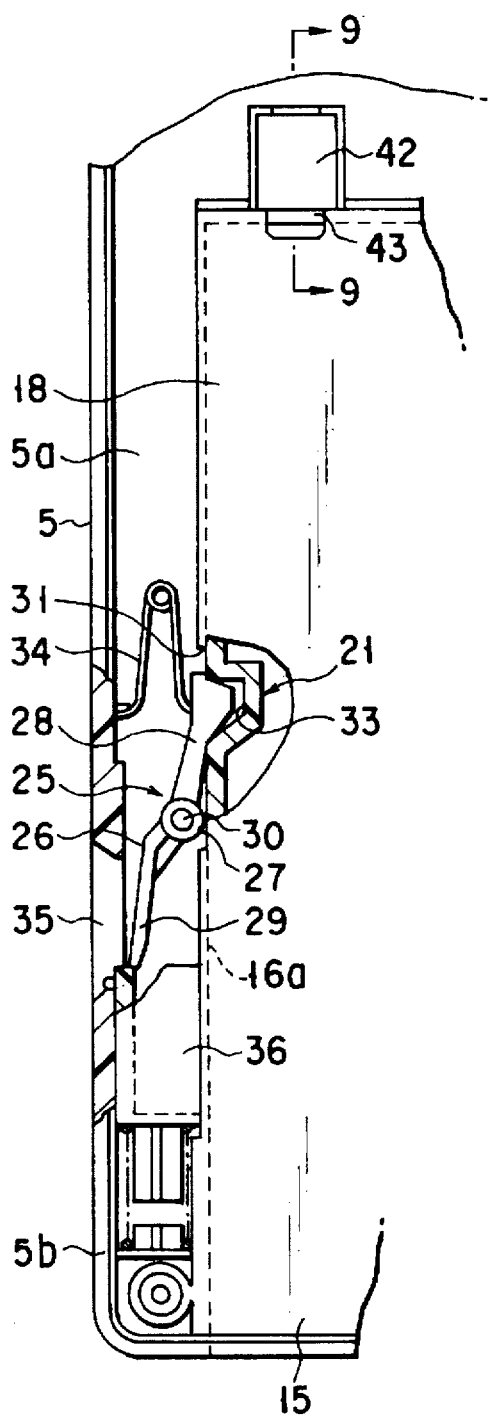
FIG. 6 is a plan view showing that part of the lower housing which contains the mechanism for locking a battery pack.

As shown in FIG. 6, the lower housing 5 contains a lock mechanism 25 designed to prevent the battery pack 21 from slipping out of the battery receptacle 15. The lock mechanism 25 has a lock lever 26 which can engage with the battery pack 21. The lock lever 26 is positioned between the left-side wall 5b of the lower housing 5 and the left-side wall 16a of the battery receptacle 15. The lever 26 comprises a hollow cylindrical support 27, an engagement member 28, and a pushing member 29. The members 28 and 29 extend from the circumferential surface of the support 27, in opposite directions. The support 27 is rotatably connected to the bottom wall 5a of the lower housing 5 by a pivot 30. The engagement member 28 and the pushing member 29 can be rotated together, around the pivot 30 in the opposite directions.

The left-side wall 16a of the battery receptacle 15 has a through hole 31. The hole 31 is located so that the engagement member 28 of the lock lever 26 opposes, via the hole 31, the left side of the battery pack 21. An engagement recess 33 is formed in the left side of the battery pack 21. The recess 33 receives the distal end of the engagement member 28 when the battery pack 21 is inserted completely into the battery receptacle 15. The lock lever 26 is biased by a coil spring 34, such that the engagement member 28 always protrudes into the battery receptacle 15. Protruding into the receptacle 15, the engagement member 28 elastically fits into the engagement recess 33 when the battery pack 21 is inserted completely into the battery receptacle 15. The battery pack 21 is then locked in the battery receptacle 15 and cannot be pulled therefrom.

Figure 7:
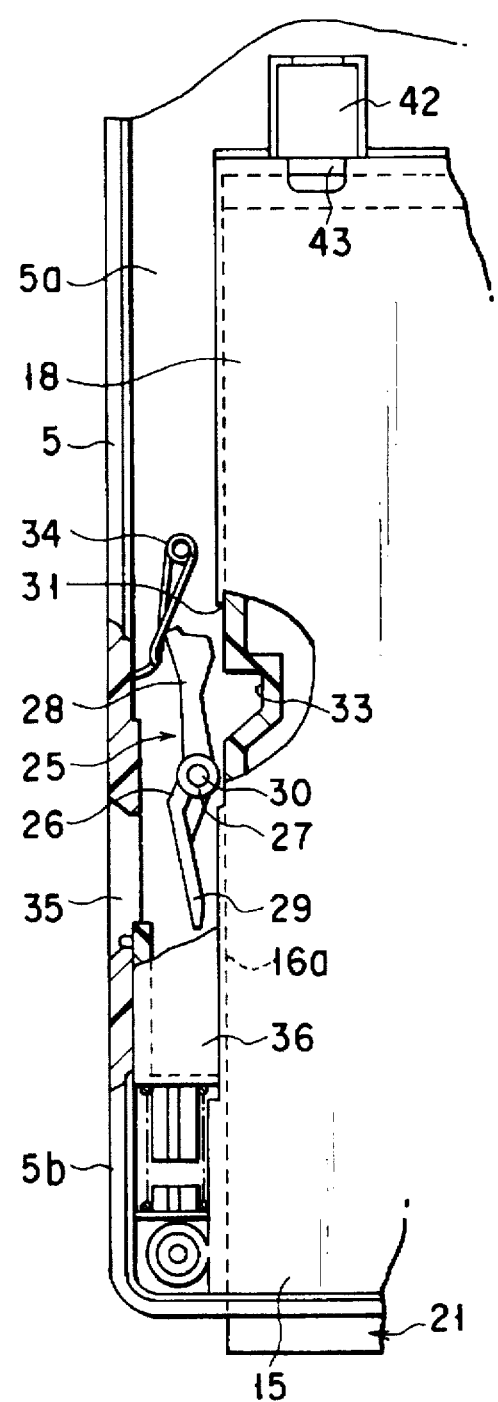
FIG. 7 is a plan view showing that part of the lower housing, for explaining how the battery pack is released.

An insertion hole 35 is formed in the left-side wall of the lower housing 5, allowing passage of the pushing member 29 of the lock lever 26. Hence, a user of the computer 1 can insert a finger through the insertion hole 35 into the lower housing 5 to unlock the pack 21 from the receptacle 15. To release the battery pack 21 from the receptacle 15, the user inserts his or her finger into the lower housing 5 through the insertion hole 35 and pushes the member 29 with the finger tip. The lock lever 26 is thereby rotated against the bias of the coils spring 34 as shown in FIG. 7, moving the engagement member 28 out of the engagement recess 33. As a result, the battery pack 21 can be removed from the battery receptacle 15. The lock mechanism 25 has a shutter 36 for closing and opening the insertion hole 35 of the lower housing 5.

Figure 8:
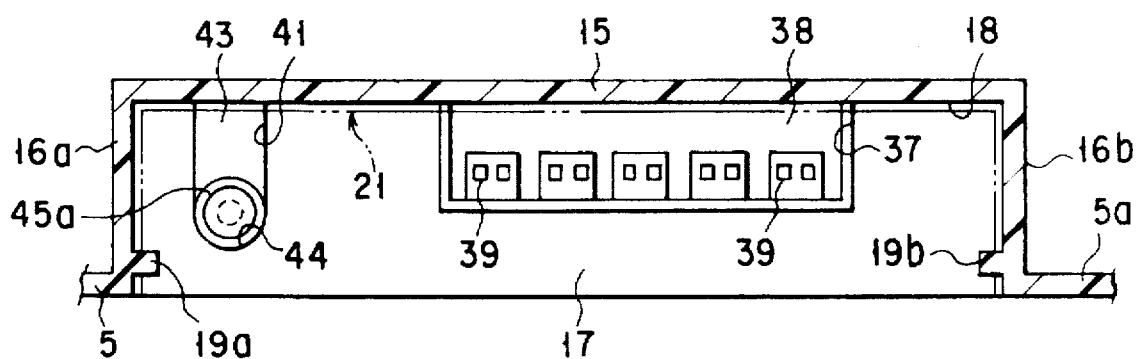
FIG. 8 is a sectional view of the battery receptacle provided in the lower housing.

As can be seen from FIGS. 4 and 8, the rear wall 17 has a through hole 37. Provided in the hole 37 is a power-supply connector 38. The power-supply connector 38 has a plurality of contacts 39 which contact the positive and negative power-supply terminals (not shown) of the battery pack 21.

Figure 9:
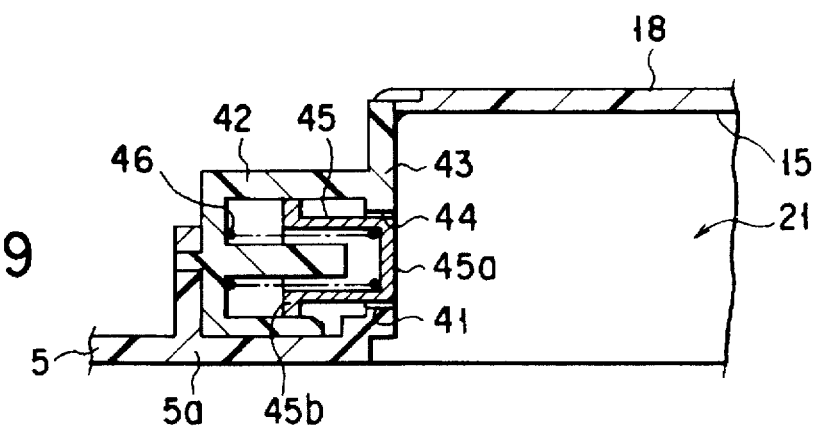
FIG. 9 is a sectional view, taken along line 9—9 in FIG. 6.

As shown in FIGS. 8, the rear wall 17 has a hole 41 located adjacent to the power-supply connector 38 and communicating with the interior of the battery receptacle 15. As shown in FIG. 9, a bracket 42 is secured to the bottom wall 5a of the lower housing 5, which is continuous to the hole 41. The bracket 42 has an engagement wall 43 fitted in the hole 41. The lower end of the wall 43 has a semicircular notch, which defines a circular opening 44, together with the lower end of the hole 41 of the rear wall 17.

As shown in PIGS. 9 and 10, the bracket 42 supports a pushing member 45. The pushing member 45 can slide back and forth in the depthwise direction of the lower housing 5. The member 45 is made of aluminum or nonconductive material such as a synthetic resin and is a hollow cylinder having a closed end 45a. The closed end 45a of the member 45 protrudes into the battery receptacle 15 through the circular opening 44. The pushing member 45 has a flange-shaped stopper 45b at the other end which is open. The pushing member 45 is biased by a coil spring 46 toward the battery receptacle 15; it is slid toward the receptacle 15 until the stopper 45b comes into engagement with the edge of the circular opening Hence, as long as the battery pack 21 inserted and locked in the receptacle 15, it will abut on the closed end 45a of the pushing member 45, as illustrated in FIG. 9. The pushing member 45 is pushed from the battery receptacle 15, despite the force of the coil spring 46, which is compressed between the bracket and the pushing member 45.

Figure 10:
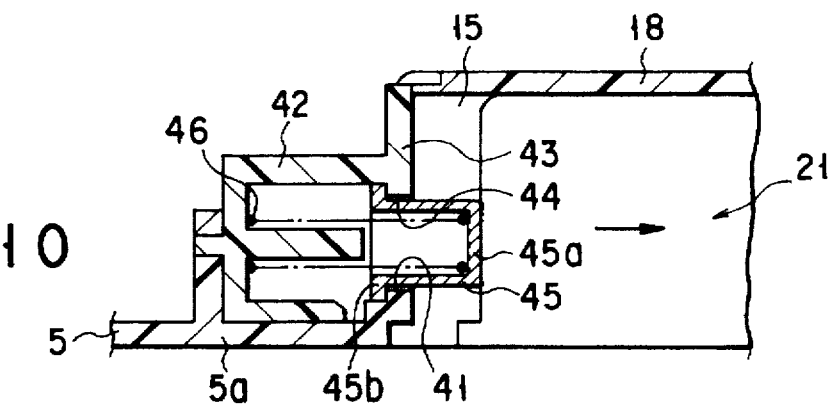
FIG. 10 is a sectional view of the lower housing, illustrating the battery pack pushed outwards by operating the pushing member.

When the battery pack 21 is released, the coil spring 46 expands as shown in FIG. 10, thrusting the pushing member 45 toward the battery receptacle 15. As a result of this, the battery pack 21 is pushed from the receptacle 15, popping out of the front of the lower housing 5. The user can therefore pull the battery pack 21 with ease.

Figure 2:
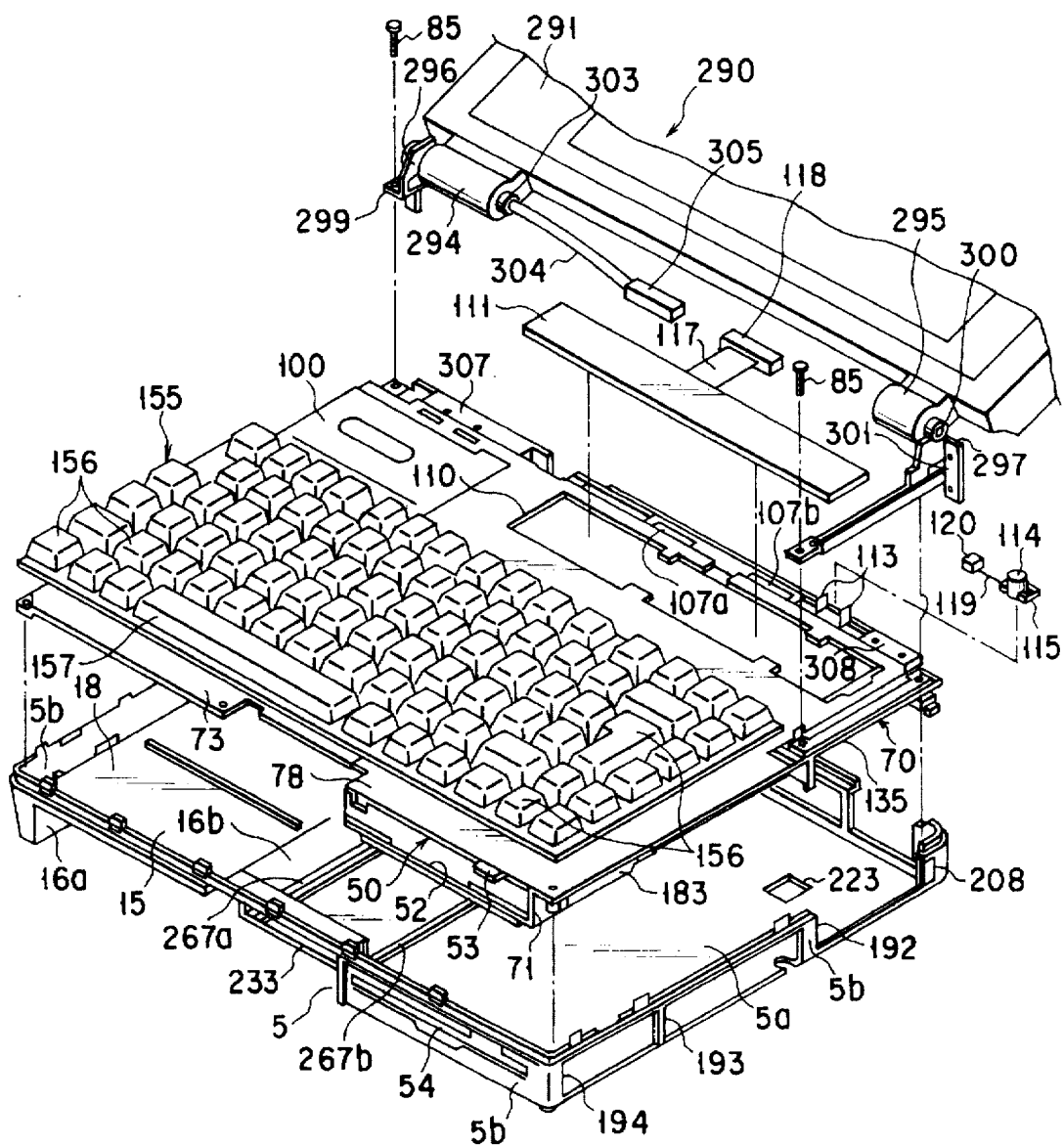
FIG. 2 is an exploded view of the portable computer, illustrating how a frame with circuit boards and an FDD mounted on the boards is incorporated into the bottom case, together with the keyboard and the display unit.
Figure 11:
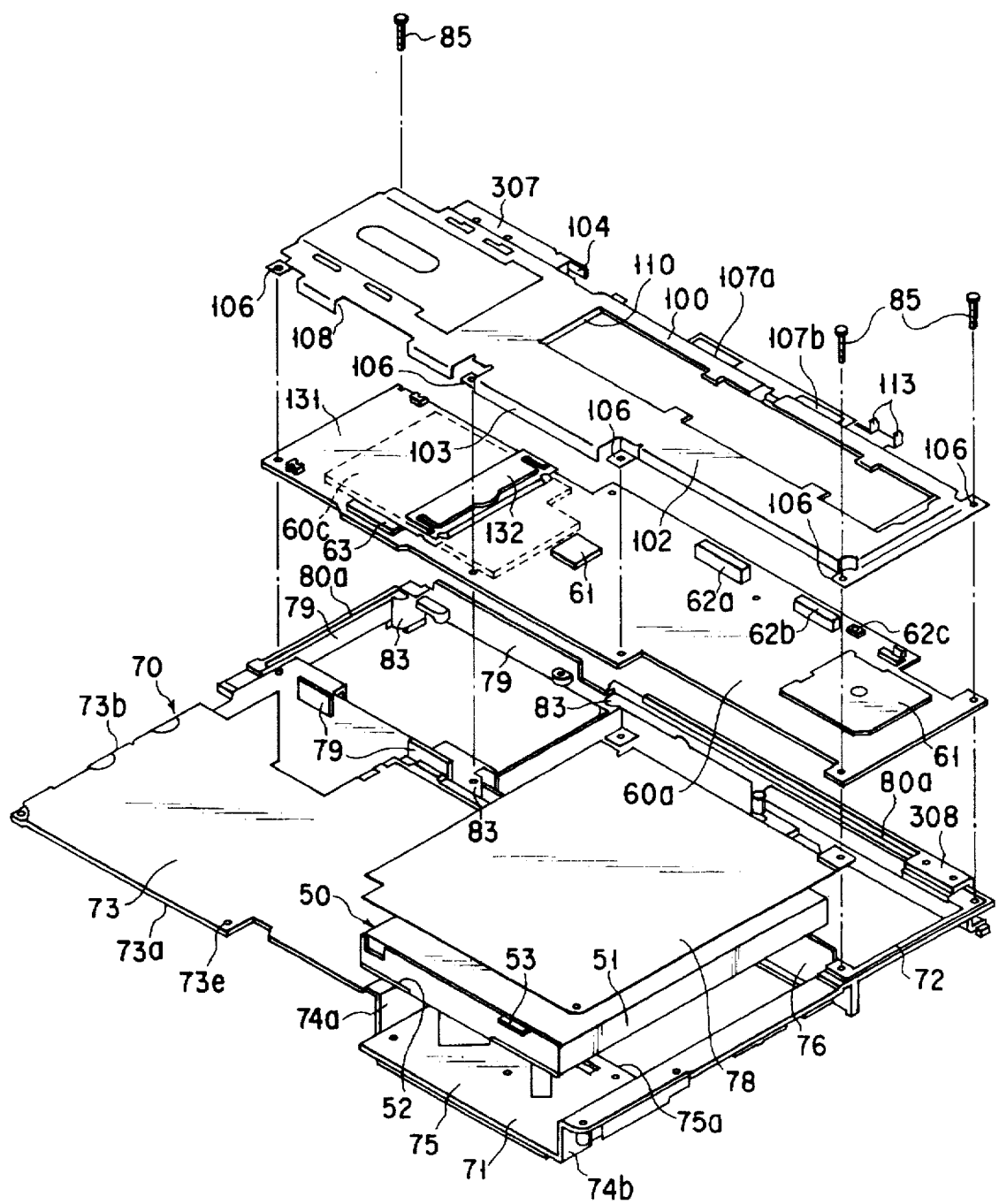
FIG. 11 is an exploded view, explaining how to incorporate the circuit boards, the FDD and the first shield plate into the frame.

As is shown in FIG. 2, a floppy disk drive 50 (hereinafter referred to as "FDD"), one of the functional components of the computer 1, is arranged in the front-right portion of the lower housing 5. As shown in FIG. 11, the FDD 50 has a box-shaped casing 51. The casing 51 has a disk port 52 and a push button 53 in its front. Through the port 52, a floppy disk is inserted into the casing 51 and ejected therefrom. The button 53 is pushed to eject a floppy disk out of the casing 51. The lower housing 5 has a port 54 in its front, through which the disk port 52 is exposed and the push button 53 protrudes.

Figure 3:
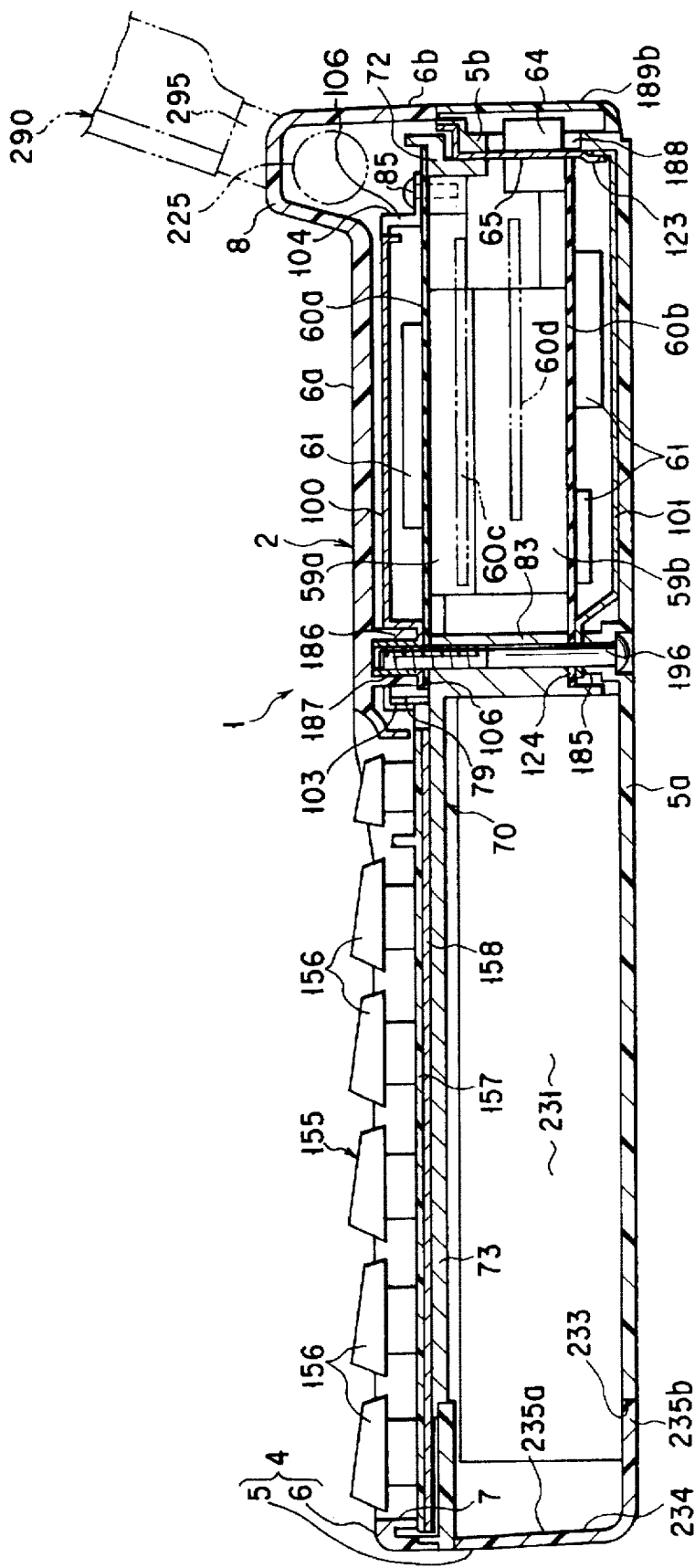
FIG. 3 is a sectional view of the book-type portable computer.

As seen from FIGS. 3, 11 and 12, four circuits boards 60a to 60d are located in the rear half of the lower housing 5. The boards 60a to 60d extend parallel to the bottom wall 5a of the lower housing 5, at the back of the battery pack 21 and the FDD 50. They are parallel to one another, spaced apart from one another, and located one above the other. As shown in FIGS. 11 and 12, the first circuit board 60a and the second circuit board 60b are rectangular plates, each extending between the left and right sides of the lower housing 5. A number of circuit parts 61, mainly IC chips, are mounted on both surfaces of each of the circuit boards 60a and 60b. In the present embodiment, the first circuit board 60a serves as a system board. On the upper surface of the first circuit board 60a, there are mounted connectors 62a to 62c and a keyboard connector 63. The connectors 62a to 62c are arranged on the rear-end portion of the board 60a, in a line extending in the widthwise direction of the lower housing 5. The keyboard connector 63 is mounted on the front-left portion of the board 60a. As shown in FIG. 3, a first relay connector 59a is arranged on the lower surface of the center portion of the first circuit board 60a.

As seen from FIG. 11, the third circuit board 60c is arranged on the lower surface of the left portion of the first circuit board 60a. This circuit board 60c is connected to the first circuit board 60a by a stacking connector (not shown). The third circuit board 60c is a power-supply board. On this board 60c there are mounted various circuit parts including the power-supply connector 38.

The second circuit board 60b, which is located below the first circuit board 60a, serves as an input/output board. As shown in FIG. 12, arranged on the upper surface of the front-center portion of the board 60b are an HDD connector 68 and an FDD connector (not shown). Arranged on the lower surface of the front-left portion of the board 60b are a pair of relay connectors 69a and 69b, which are located side by side. The fourth circuit board 60d is arranged on the upper surface of the second circuit board 60b and is connected thereto by a stacking connector (not shown). The fourth circuit board 60d is an acoustic board, on which various circuit parts (not shown) are mounted.

The third and fourth circuit boards 60c and 60d are arranged side by side, in the gap between the first and second circuit boards 60a and 60b. Among the circuit parts mounted on the first to fourth circuit boards 60a to 60d are those which generate a high-frequency noise while operating.

As illustrated in FIGS. 3 and 44, a plurality of interface connectors 64 and a connector panel 65 are secured to the rear end of the second circuit board 60b. The interface connectors 64 are provided for connection with extension devices such as a printer and an external CRT display. As shown in FIGS. 3 and 12, the connector panel 65, which is a formed plate, projects upwards from the rear edge of the second circuit board 60b and extends in the lengthwise direction thereof. The connector panel 65 has a height substantially equal to the thickness of the lower housing 5. The connector panel 65 has connector holes 66, which expose the interface connectors 64.

As shown in FIG. 12, a pair of jacks 67a and 67b are mounted on the left end portion of the second circuit board 60b. The jacks 67a and 67b are provided for electrical connection with the plugs of a headphone or microphone. A second relay connector 59b is mounted on the upper surface of the center portion of the second circuit board 60b. As shown in FIG. 3, the second relay connector 59b is connected to the above-mentioned first relay connector 59a, whereby the first and second circuit boards 60a and 60b are electrically connected together.

The FDD 50 and the circuit boards 60a to 60d are secured to the lower housing 5 by means of a frame 70. As shown in FIGS. 11 and 12, the frame 70 comprises an FDD-supporting section 71, a board-supporting section 72 and a keyboard-supporting section 73—which are integral with one another. The section 71 supports the FDD 50, while the section 72 supports the circuit boards 60a to 60d. The frame 70 is a die-cast molding made of magnesium alloy, which is an electrically conductive material. As can be understood from FIG. 14, the frame 70 has substantially the same size as the lower housing 5.

The FDD-supporting section 71 is a rectangular, shallow open box. It is made of a left-side wall 74a, a right-side wall 74b, a bottom wall 75 connecting the walls 74a and 74b, and a rear wall 76 connecting the rear ends of the side walls 74a and 74b. The walls 74a, 74b, 75 and 76 define a recess, in which the FDD 50 is fitted. The FDD 50 has its left and right sides fastened to the side walls 74a and 74b by two screws on either side. The FDD 50 is positioned, with its upper surface located flush with or a little below the upper edges of the side walls 74a and 74b. In other words, the FDD 50 is completely contained within the FDD-supporting section 71. The upper surface of the FDD 50 is covered with a shield plate 78, which is a formed metal plate, as illustrated in FIG. 11.

The board-supporting section 72 has a wall 79 surrounding the first circuit board 60a and the second circuit board 60b. The section 72 is shaped like a rectangular frame, elongated over the entire width of the lower housing 5 and located at the back thereof. The section 72 is made integral with the FDD-supporting section 71; a part of its wall 79 being the rear wall 76 of the FDD-supporting section 71. The wall 79 is composed of four strips, each extending in the direction of the height of the lower housing 5. As shown in FIGS. 11 to 13, stepped portions 80a are formed at the upper edges of the strips, and stepped portions 80b are formed at the lower edges of the strips. Removably fitted in the stepped portions 80a are the four edges of the first circuit board 60a. Removably fitted in the stepped portions 80b are the four edges of the second circuit board 60b. The rear strip of the wall 79 has a cut 81 which exposes the interface connectors 64. The left strip of the wall 79 has a cut 82, through which the jacks 67a and 67b are exposed. The wall 79 has a plurality of bosses 83, which are spaced apart from one another. The top and bottom of each boss 83 is flush with the stepped portions 80a and 80b.

As shown in FIG. 11, the first circuit board 60a is fitted at the stepped portion 80a made in the upper edges of the strips constituting the wall 79. The circuit board 60a is fastened, at edge portions, to the tops of the bosses 83 by screws 85 made of metal. The first circuit board 60a contacts, at the edge portions, the stepped portions 80a of the wall 79.

As shown in FIG. 12, the second circuit board 60b is fitted at the stepped portion 80b made in the lower edges of the strips constituting the wall 79. The circuit board 60b is fastened, at edge portions, to the bottoms of the bosses 83 by screws 87 made of metal. The second circuit board 60b contacts, at the edge portions, the stepped portions 80b of the wall 79. That portion of the wall 79 which form the front of the board-supporting section 72 has three cuts 88, 89 and 90. The cut 88 exposes the HDD connector 68, the cut 89 communicates with the hole 37 of the battery receptacle 15, and the cut 90 exposes the bracket 42.

As can be seen from FIGS. 11 and 12, of the strips constituting the wall 79 of the board-supporting section 72, the front strip and the rear strip have portions protruding upwards from the stepped portions 80a and downwards from the stepped portions 80b. In other words, these portions of the front and rear strips are located above the first circuit board 60a and below the second circuit board 60b.

As shown in an enlarged view of FIG. 20, two wiring patterns 93 for grounding are formed on the surfaces of each edge portion of the first circuit board 60a, respectively. The wiring patterns 93 on the lower surface of the board 60a are set in contact with the stepped portion 80a of the wall 79 since the first circuit board 60a is fastened by screws to the stepped portions 80a.

As shown in FIG. 21, two conductors 94 are formed on the upper and lower surfaces of that portion of the first circuit board 60a. The conductors 94 are electrically connected to the wiring patterns 93. The conductors 94 on the lower surface of the board 60a contacts the top of the bosses 83 since the first circuit board 60a is fastened by screws to the board-supporting section 72. Although not shown, similar wiring patterns and conductors are formed on both surfaces of the second circuit board 60b. Since the wiring patterns 93, the stepped portions 80a and 80b, the conductors 94, and the bosses 83 contact one another, the circuit boards 60a and 60b and the frame 70 are electrically connected together.

Referring back to FIGS. 11 and 12, two shield plates 100 and 101 are attached to the frame 70. The first shield plate 100 covers the first circuit board 60a from above. The second shield plate 101 covers the second circuit board 60b from below. Both shield plates 100 and 101 are formed of plates made of conductive material.

The first shield plate 100 has a flat substrate 102 covering the first circuit board 60a from above. The substrate 102 is elongated, extending in the widthwise direction of the lower housing 5. The substrate 102 has a front flange 103 and a rear flange 104. The flanges 103 and 104 extend downwards, over the upper edge of the wall 79 of the board-supporting section 72. The first shield plate 100 is thereby positioned over the section 72 in the depth direction of the lower housing 5.

A plurality of tongues 106 are formed integral with the edges of the substrate 102. The tongues 106 are located right above the bosses 83 of the board-supporting section 72. Some of the tongues 106 are fastened to the first circuit board 60a by the screws 85. As is shown in FIG. 21, the tongues 106 contact the conductors 94 provided on the first circuit board 60a. The first shield plate 100 is thereby electrically connected to the first circuit board 60a.

As can be seen from FIG. 11, the substrate 102 has connector holes 107a and 107b, through which are exposed the connectors 62a and 62b provided on the first circuit board 60a. The front flange 103 of the substrate 102 has a cut 108, through which the keyboard connector 63 is exposed.

The substrate 102 has an elongated recess 110 in its left half. The recess 110 extends in the widthwise direction of the lower housing 5. As shown in FIG. 2, a liquid-crystal display panel 111 is fitted in the elongated recess 110. The display panel 111 is elongated and designed to display various operating conditions of the computer 1. The display panel 111 opposes the top wall 6a of the upper housing 6. The top wall 6a has a window 112, which is located right above the display panel 111 and exposes the display panel 111. The panel 111 is connected to a flexible circuit board 117, which is connected to a connector 118. The connector 118 extends through the connector hole 107b and is connected to the connector 62b provided on the first circuit board 60a.

As is shown in FIGS. 2 and 11, support members 113 are formed integral with the rear end of the substrate 102, protruding upwards, and are located at the back of the elongated recess 110. A holder 115 made of rubber is clamped between the support members 113, and holds a microphone 114. The microphone 114 has lead lines 119, which are connected to a connector 120. The connector 120 is connected to the connector 62c arranged on the first circuit board 60a. The microphone 114 is contained in the hollow raised section 8 of the upper housing 6. As shown in FIG. 1, the raised section 8 has small holes 116 in its top wall. These holes 116 are located above the microphone 114 so that the microphone 114 may catch sounds generated outside the computer 1.

As shown in FIG. 12, the second shield plate 101 has a flat substrate 121 which covers the second circuit board 60b from below. The substrate 121 is elongated, extending in the widthwise direction of the lower housing 5. The substrate 121 has a front flange 122 and a rear flange 123. The front flange 122 extends upwards from the front edge of the substrate 121, covering the lower end portion of the wall 79 of the board-supporting section 72. The rear flange 123 extends upwards from the rear edge of the substrate 121, covering the rear edge of the connector panel 65. The second shield plate 101 is thereby positioned with respect to the board-supporting section 72, in the depthwise direction of the lower housing 5.

A plurality of tongues 124 are formed integral with the edges of the substrate 121. The tongues 124 are located right below the bosses 83 of the board-supporting section 72. Some of the tongues 124 are fastened to the second circuit board 60b by the screws 87. The tongues 124 contact the conductors provided on the second circuit board 60b. The second shield plate 101 is thereby electrically connected to the second circuit board 60b.

As can be seen in FIG. 12, the second shield plate 101 has a cut 125 in its front-right portion. The cut 125 opposes the relay connectors 69a and 69b and, hence, exposes these connectors 69a and 69b. A wall 127 is formed integral with the left end of the second shield plate 101. This wall 127 stands upright, beside the jacks 67a and 67b and the cut 82 made in the wall 79. The wall 127 has two through holes 128a and 128b spaced apart in the depthwise direction of the lower housing 5. These holes 128a and 128b expose the jack receptacles (not shown) provided within the lower housing 5.

As shown in FIGS. 11 and 22, a first card receptacle 131 is located between the left end portion of the first circuit board 60a and the first shield plate 100. As shown in FIG. 22, the first card receptacle 131 opens on the left side of the frame 70, when viewed from the back of the housing 4. The receptacle 131 is provided to contain a memory card 133. A card connector 132 is arranged at the rear end of the first card receptacle 131. The memory card 133 can be removably connected to the card connector 132. The card connector 132 is mounted on the upper surface of the first circuit board 60a. A card ejector 134 is fixed to the first shield plate 100, for ejecting the memory card 133 from the first card receptacle 131.

As shown in FIG. 23, a second card receptacle 135 is located between the right end portion of the first circuit board 60a and the right end portion of the second circuit board 60b. The second card receptacle 135 opens on the left side of the frame 70, when looked at from the back of the housing 4. The receptacle 135 is provided to contain an extension card 136 having substantially the same shape as the memory card 133, such as an interface card for achieving communication between the computer 1 and external apparatuses or an application card storing an application program. The extension card 136 has connection terminals 137a and 137b on its front and back, respectively. A card connector 138 is arranged at the rear end of the second card receptacle 135. The extension card 136 can be removably connected, at its connection terminal 137a, to the card connector 138. The card connector 138 is mounted on the upper surface of the second circuit board 60b.

As shown in FIGS. 12 and 23, a metal cover 140 is arranged in the second card receptacle 135. The cover 140 comprises two side walls 141a and 141b, a rear wall 142 connecting the rear ends of the side walls 141a and 141b and a top wall 143 connecting the upper edges of the walls 141a, 141b and 142. The metal cover 140 is therefore shaped like a box open at the bottom and right side of the frame 70. A support wall 144 horizontally extends from the rear wall 142. The support wall 144 is located and between the front and rear walls 79 of the board-supporting section 72 and beneath a reinforcing wall 145 which extends between the walls 79. The support wall 144 is fastened to the reinforcing wall 145 by screws 146.

As seen from FIG. 12, the side walls 141a and 141b extend into the gap between the wall 79 of the board-supporting section 72. The side walls 141a and 141b have support members 147a and 147b, respectively, at their ends which face away from the rear wall 142. The support members 147a and 147b are clamped between the second circuit board 60b and the bosses 83 and are fastened to the frame 70 by screws 87. Hence, the cover 140 covers both sides, top and rear of the second card receptacle 135, preventing noise from leaking into outside of the second card receptacle 135 from the node of the extension card 136 and the card connector 138.

Referring to FIG. 23 again, the second card receptacle 135 contains an ejector 150 for ejecting the extension card 136 out of the receptacle 135. The ejector 150 has a sliding plate 151 which can slide from left to right and vice versa on the lower surface of the second shield plate 101. The sliding plate 151 has an engagement member 152 extending upwards from that end located at the card connector 138. The engagement member 152 projects into the second card receptacle 135 through the second shield plate 101 and the second circuit board 60b and can contact the distal end of the extension card 136. A lever 153 is connected to the lower surface of the sliding plate 151.

Figure 17:
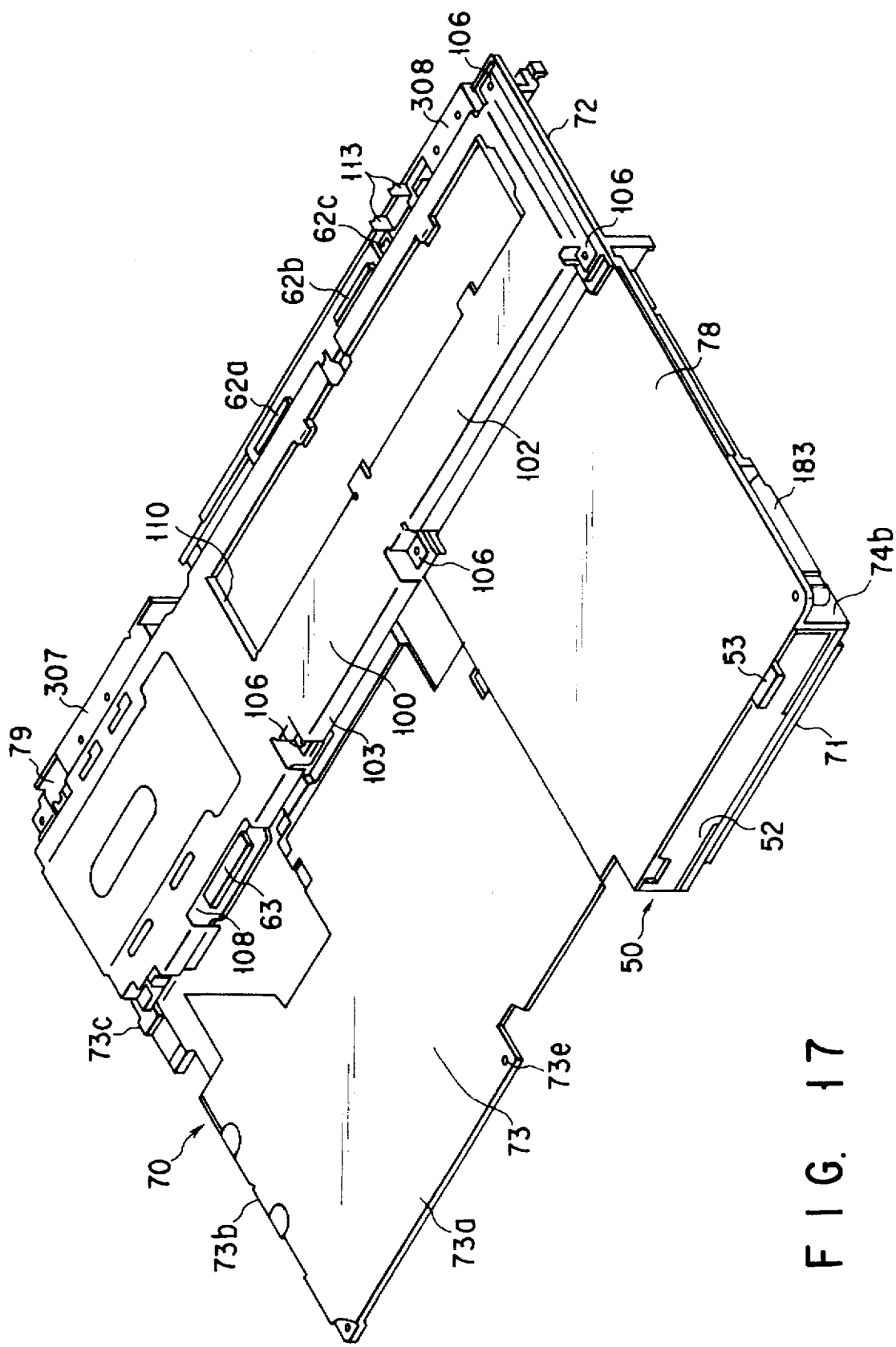
FIG. 17 is a perspective view, showing the frame as viewed from above, and also showing the FDD, the first circuit board and the first shield plate—all fitted in the frame.
Figure 18:
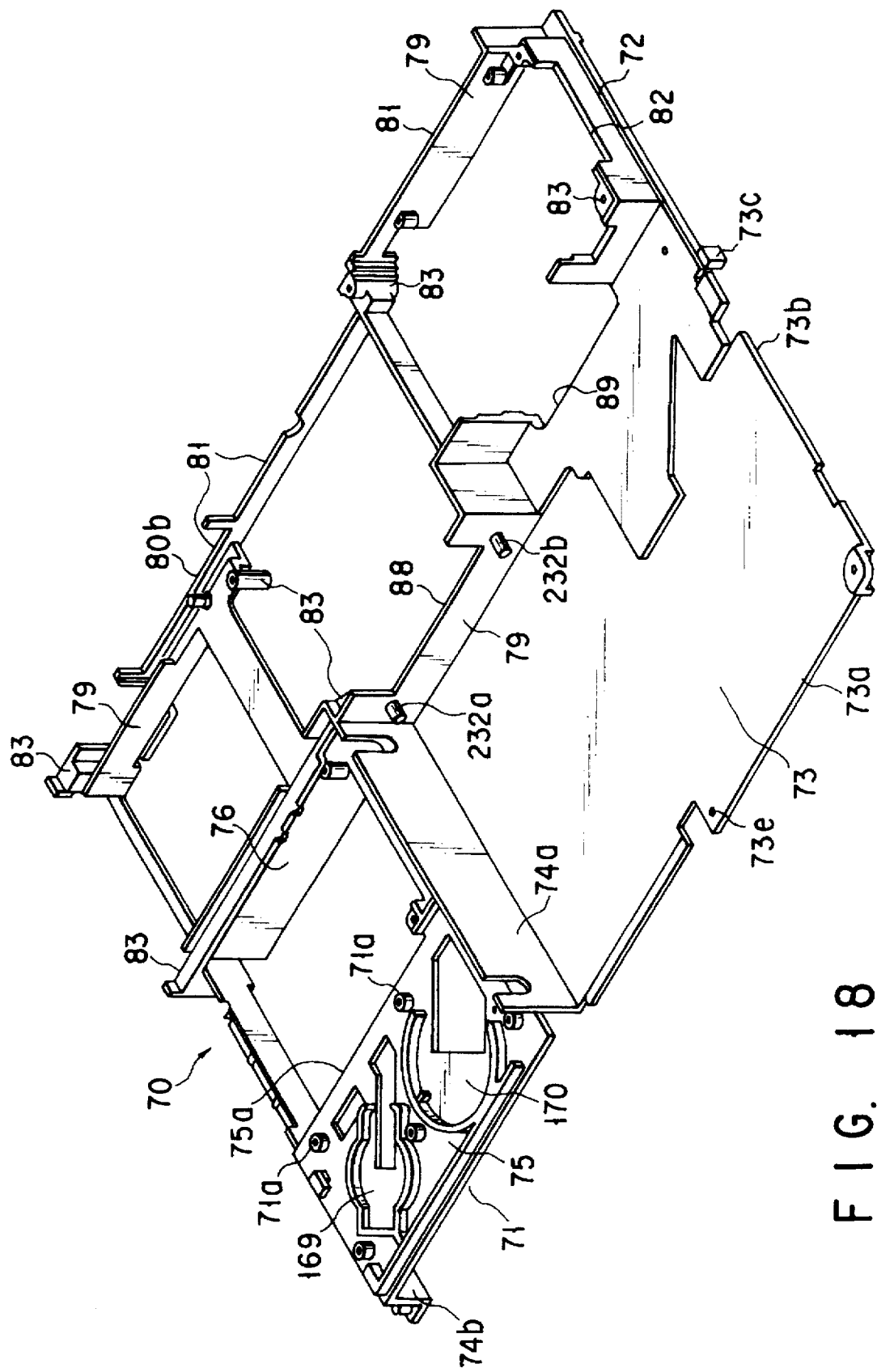
FIG. 18 is a perspective view, showing the frame positioned upside-down with respect to its position shown in FIG. 17.

As shown in FIGS. 13 and 18, keyboard-supporting section 73 of the frame 70 is a rectanglar plate extending between the wall 79 of the board-supporting section 72 and the left side wall 74a of the FDD-supporting section 71. As illustrated in FIG. 17, the keyboard-supporting section 73 is continuous to the shield plate 78 and is substantially flush with the upper surface of the shield plate 78. A keyboard 155, used as data input means, is mounted on the upper surface of the section 73 and that of the shield plate 78. As shown in FIGS. 2 and 3, the keyboard 155 has a keyboard body 157 which has a number of keys 156. The keyboard body 157 is a rectangular plate. A reinforcing plate 158 made of aluminum is laid on the lower surface of the keyboard body 157 and contacts the upper surface of the section 73 and that of the shield plate 78. The reinforcing plate 158 not only reinforces the keyboard body 157 but also works as a shield for preventing noise, made when any key 156 is depressed, from leaking into the housing 4. The keyboard 155 is connected by a flexible wire-board (not shown) to the keyboard connector 63 of the first circuit board 60a.

As is shown in FIG. 12, an extension circuit board 160 is arranged on the bottom wall 75 of the FDD-supporting section 71. As can be understood from FIG. 24, the circuit board 160 comprises a part-mounting portion 400 and flexible portions 401 connected to the portion 400.

Figure 25:
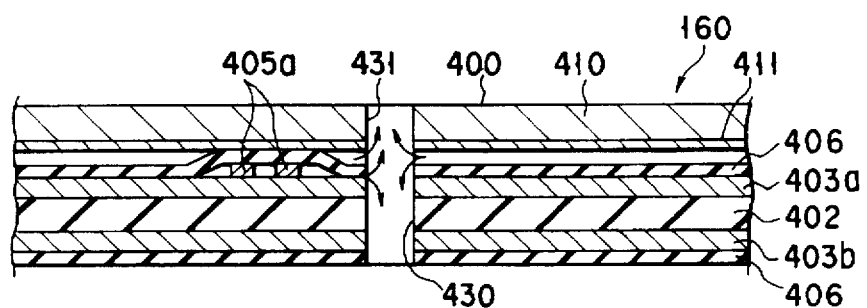
FIG. 25 is a sectional view of the part-mounting portion of the extension circuit board.

The extension circuit board 160 is a flexible printed circuit board. As shown in FIG. 25, it has a flexible insulating plate 402 made of a polyimide-based material. Power-supply wiring patterns 403a and 403b are laid on the upper and lower surfaces of the insulating plate 402, respectively. An insulating film (not shown) is formed on the power-supply wiring pattern 403a, and a plurality of signal lines 405a are laid on the insulating film. Similarly, an insulating film (not shown) is formed on the power-supply wiring pattern 403b, and a plurality of signal lines 405b and grounding lines 405c are laid on this insulating film. The wiring patterns 403a and 403b and the signal lines 405a, 405b and 405c are arranged on not only the part-mounting portion 400 but also on the flexible portions 401.

Figure 24:
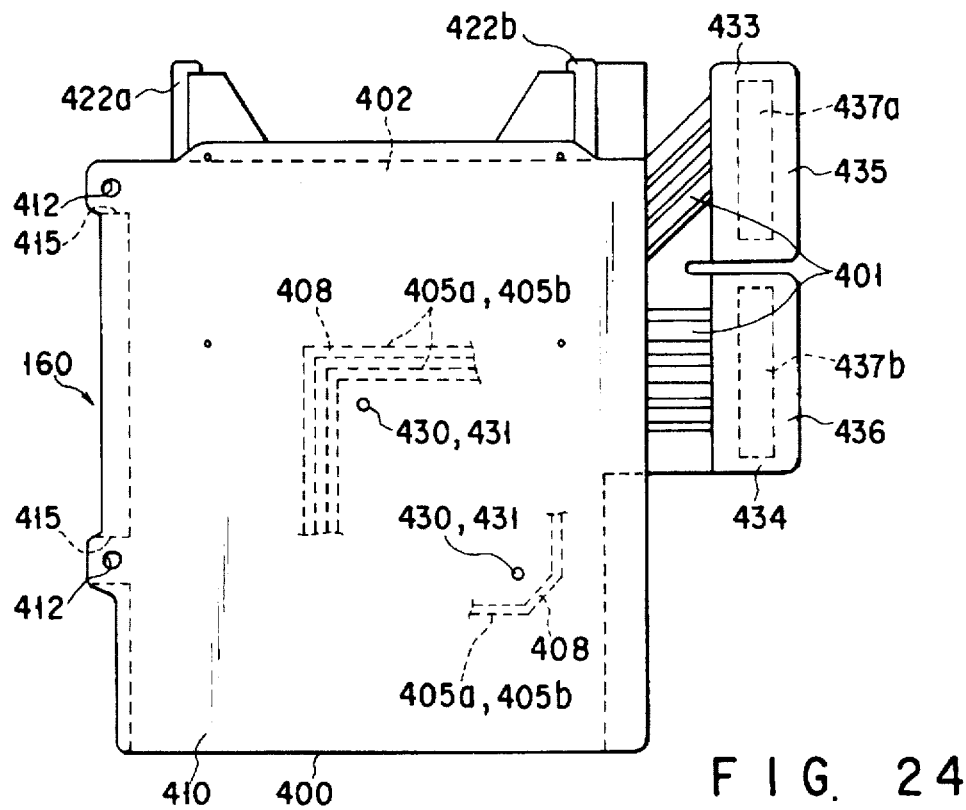
FIG. 24 is a plan view of the extension circuit board.

A protective film 406, which is electrically insulating, is laid on the lines 405a, 405b and 405c and the power-supply wiring patterns 403a and 403b and thus covers these lines. The signal lines 405a and 405b are arranged in desired patterns, forming wiring patterns. As shown in FIG. 24, these wiring patterns each have corners 408. At one corner 408, the signal lines 405a, 405b are bent by 90°. At another corner 408, the signal lines 405a, 405b are bent twice, each time by 45°, so that each signal line has a slanting portion. The lines 405a, 405b and 405c have a certain thickness, though extremely small. Therefore, as shown in FIG. 25, the protective film 406 covering the lines 405a is undulating.

Figure 27:
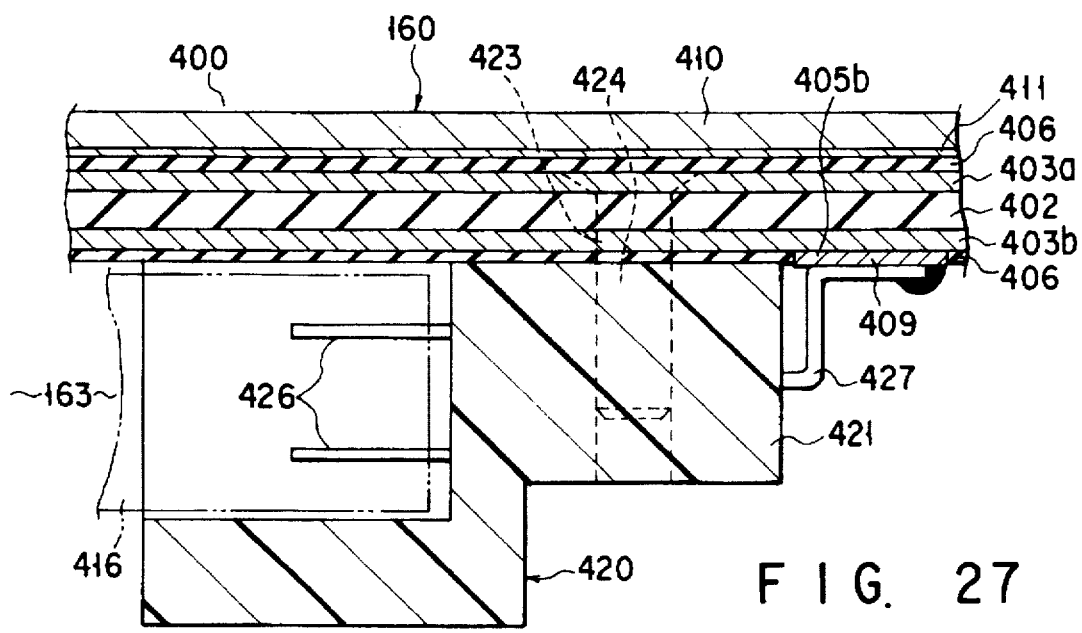
FIG. 27 is a sectional view showing a card connector mounted on the part-mounting portion of the extension circuit board.

As shown in FIG. 27, the signal lines 405b has connecting pads 409, which are arranged on the part-mounting portion 400. The pads 409 are not covered with the protective film 406, unlike the other portions of the signal lines 405b. The connecting pads 409 are so thick that their lower surfaces are located a little below the protective film 406.

A reinforcing plate 410 made of metal is bonded with adhesive 411 to the part-mounting portion 400 of the extension circuit board 160. The plate 410 maintains the portion 400 flat and straight and renders the portion 400 rigid. Having no such reinforcing plate 410, the flexible portion 401 of the extension circuit board 160 may become bent and deformed. The plate 410 is also square and has the same size as the part-mounting portion 400. It is made of stainless steel and is 0.2 mm to 0.3 mm thick.

Figure 26:
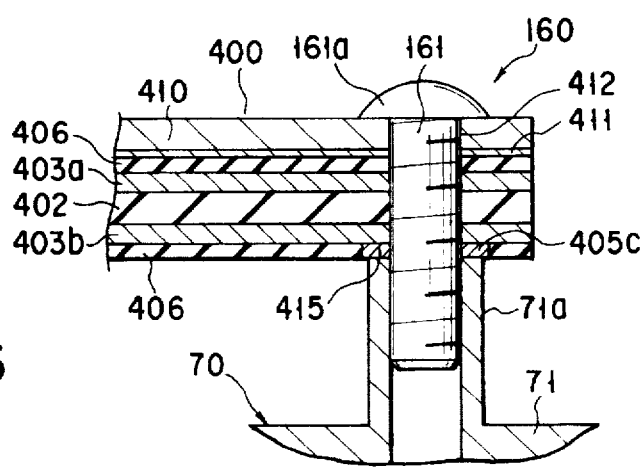
FIG. 26 is a sectional view, for explaining how the part-mounting portion is fastened to the frame.

The part-mounting portion 400 including the reinforcing plate 410 has holes 412 in their edge portions. As shown in FIGS. 12 and 26, these holes 412 oppose hollow cylindrical seats 71a which protrude downward from the lower surface of the FDD-supporting section 71. The portion 400 is fastened to the lower surface of the section 71 by screws 161 made of metal (only one shown in FIG. 26), each passing through the hole 412 and set in screw engagement in the hollow cylindrical seat 71a. As seen from FIG. 26, the head 161a of each screw 161 contacts the reinforcing plate 410, whereby the reinforcing plate 410 is electrically connected to the frame 70 by the screws 161.

As shown in FIGS. 24 and 26, the grounding lines 405c have a plurality of lands 415. The lands 415 communicate with the holes 412 and are aligned with the seats 71a. Therefore, the lands 415 contact the upper surfaces of the seats 71a as long as the part-mounting portion 400 remains fixed to the seats 71a. In this state, the reinforcing plate 410 of the portion 400 is electrically connected by the screws 161 to the grounding lines 405c and the frame 70.

Referring to FIG. 12 again, the bottom wall 75 of the FDD-supporting section 71, which opposes the part-mounting portion 400, has an opening 75a. The opening 75a and the portion 400 define a third card receptacle 163. The third card receptacle 163 opens at the right side of the FDD-supporting section 71. Hence, the second card receptacle 135 and the third card receptacle 163 are arranged, one in front of the other, on the right-side portion of the frame 70. As shown in FIG. 27, an extension card 416, such as an interface card or an application card, can be inserted into the third card receptacle 163.

Figure 19:
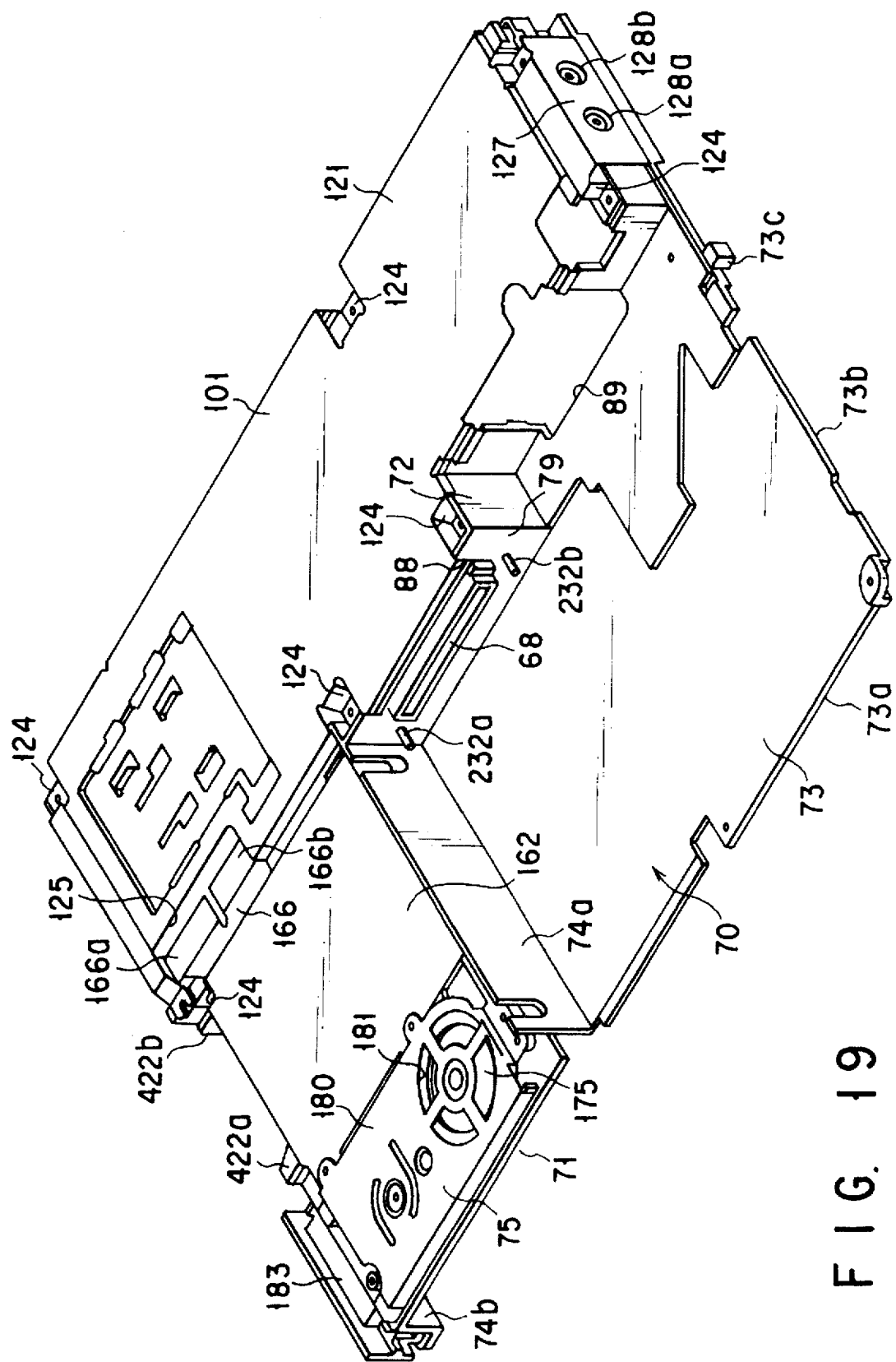
FIG. 19 is a perspective view, showing the frame positioned upside-down with respect to its position shown in FIG. 17, and also showing the extension circuit board, the second circuit board, the second shield plate and the speaker holder—all fitted in the frame.

As is shown in FIG. 27, a card connector 420 is mounted on that side of the part-mounting portion 400 which faces away from the reinforcing plate 410. The card connector 420 is located at the rear end of the third card receptacle 163 and has a connector body 421 made of a synthetic resin. The connector body 421 has a pair of guide rails 422a and 422b for guiding the extension card 416 into the third card receptacle 163, as is shown in FIGS. 12 and 19. The connector body 421 is fitted and secured in a hole 423 made in the part-mounting portion 400, by means of screws 424.

As seen from FIG. 27, the connector body 421 has a number of pin terminals 426 for connection with the extension card 416. Each pin terminal 426 has a lead 427 projecting outwards from the connector body 421. The leads 427 are soldered to the connection pads 409 of the signal lines 405b.

As shown in FIG. 25, the part-mounting portion 400 has a first venthole 430 which extends through the insulating plate 402 and the protective film 406. The reinforcing plate 410, which maintains the part-mounting section 400 flat and straight, has a second venthole 431. The first and second ventholes 430 and 431 are axially aligned. The first and second ventholes 430 and 431 are located in the corner 408 defined by the signal lines 405a, as is illustrated in FIG. 24. The first venthole 430 opens to outside at one end; so does the second venthole 431. Namely, the ventholes 430 and 431 constitute a single through hole which extends through the entire thickness of the part-mounting portion 400.

As shown in FIG. 24, a pair of terminal sections 433 and 434 are connected to the distal ends of the flexible portion 401. The sections 433 and 434 have rigid support plates 435 and 436, respectively. The support plates 435 and 436 maintain the terminals sections 433 and 434 flat and straight. They are made of stainless steel and have a thickness ranging from 0.2 mm to 0.3 mm. The terminal sections 433 and 434 have relay connectors 437a and 437b, on the side facing away from the support plates 435 and 436. The relay connectors 437a and 437b are connected to the relay connectors 69a and 69b, respectively, which are mounted on the second circuit board 60b. The extension circuit board 160 is thereby electrically connected to the second circuit board 60b.

The extension circuit board 160 is manufactured by the method described below.

First, the power-supply wiring patterns 403a and 403b are laid on the upper and lower surfaces of the insulating plate 402, respectively. Further, the signal lines 405a and 405b and the grounding lines 405c are placed on the wiring patterns 403a and 403b. The protective film 406 is then put on, covering the wiring patterns 403a and 403b and the lines 405a, 405b and 405c. Next, the insulating plate 402, the wiring patterns 403a and 403b, the lines 405a, 405b and 405c, and the protective film 406 is pressed together, forming a laminated flexible printed circuit board, i.e., the extension circuit board 160.

The adhesive 411 is applied onto the lower surface of the extension circuit board 160. The reinforcing plate 410 is placed on the lower surface of the board 160. Then, the board 160 and the plate 410 are pressed together, thereby forming the part-mounting portion 400 which is rigid.

Then, the protective film 406 is peeled from the connection pads 409, and solder paste is print-coated on the connection pads 409. The card connector 420 is secured to the portion 400 by the screws 424, placing the leads 427 of the connector 420 into contact with the connection pads 409. The extension circuit board 160 is heated in a solder-reflow furnace, soldering the leads 427 to the connection pads 409. The card connector 420 is thereby fastened and soldered to the part-mounting portion 400.

The lines 405a, 405b and 405c provided on the power-supply wiring patterns 403a and 403b have a thickness, though extremely small. Consequently, as shown in FIG. 25, there is formed step between the lines 405a, on the one hand, and the wiring pattern 403a. Due to the presence of the step, the protective film 406 warp upwards at that portion which cover the lines 405a. Space may inevitably be formed between the protective film 406 and the wiring pattern 403a, at the position where the lines 405a are arranged. In this space, air is likely to remain. Since the film 406 warps upwards at said portion, space may be formed between the film 406 and the reinforcing plate 410. In this space, too, air is likely to remain.

The air is expelled outside via the gap between the wiring pattern 403a and the protective film 406 and the protective film 406 and reinforcing plate 410 when the extension circuit board 160 is pressed. However, the air in the corner 408 defined by the signal lines 405a cannot be expelled through these gaps. Nonetheless, the air is forced out through the ventholes 430 and 431 made in the board 160 and the reinforcing plate 410 as indicated by the arrows shown in FIG. 25, when the extension circuit board 160 is pressed or when the reinforcing plate 410 is pressed onto the board 160.

No air remain in the corners 408 or at the interface between the power-supply wiring pattern 403a and the protective film 406 contacting the pattern. Nor does air remain at the interface between the protective film 406 and the reinforcing plate 410. That is, there is no air at these interface that will expand when the leads 427 of the card connector 420 are connected to the connection pads 409 by means of soldering. Hence, neither the protective film 406 nor the reinforcing plate 410 will not come off to cause electrical disconnection in the extension circuit board 160 or to impair the flatness of the part-mounting portion 400.

As indicated above, the first venthole 430 is not be filled or reduced in its opening as the holes 412 of the insulating plate 402, when the card connector 420 is attached to the part-mounting portion 400. The first venthole 430 allows the air to escape reliably from the corners 408 when the circuit board 160 and the reinforcing plate 410 are pressed together.

The ventholes 430 and 431 are coaxial and communicate with each other. The air can therefore expelled through the holes 430 and 431 from the interfaces among the power-supply wiring pattern 403a and the protective film 406 and from the interface between the protective film 406 and the reinforcing plate 410. The air can escape in any directions. Air can therefore be forced out efficiently from the corners 408 when the circuit board 160 and the reinforcing plate 410 are pressed together.

As described above, the card connector 420 is attached to the part-mounting portion 400. The node of the extension card 416 and the card connector 420 generates high-frequency noise since high-frequency signals are supplied through this node. The reinforcing plate 410, which maintains the section 400 flat and straight, is made of a conductive metal such as stainless steel. The plate 410 therefore shields the high-frequency noise. The part-mounting portion 400 need not have a member for shielding noise only, and its manufacturing cost is lower than otherwise.

Made of stainless steel, the reinforcing plate 410 is superior in bending strength to a conventional one made of glass-epoxy composite material. The plate 410 can be as thin as 0.2 mm to 0.3 mm, while a conventional reinforcing plate having the same bending strength must be 0.8 mm or more than twice as thick as the plate 410. The part-mounting portion 400 of the extension circuit board 160, which includes the plate 410, is not much thicker than the flexible portion 401 of the extension circuit board 160. The part-mounting portion 400 is therefore relatively thin and light. Made thin and light, and requiring no a member for shielding noise, the extension circuit board 160 can be incorporated well within the housing 4 which has a limited size.

When the part-mounting portion 400 is fastened by the screws 161 to the FDD-supporting section 71 of the frame 70, the lands 415 of the grounding lines 405c contact the hollow cylindrical seats 71a of the section 71. Since the screws 161 pass through the lands 415 and are set in the seats 71a, they electrically connect the reinforcing plate 410 to the plated layer of the lower housing 5. Cooperating with the plated layer, the reinforcing plate 410 surrounds the card connector 420, confining the high-frequency noise emanating from the node of the card 416 and the connector 420 in the housing 4. In other words, the reinforcing plate 410 serves as an effective noise-shielding plate.

Cables or connectors are not required at all, to electrically connect the reinforcing plate 410 to the lower housing 5. This saves the space in the housing 4. In addition, since the reinforcing plate 410 is grounded at the same time the portion 400 is fixed secured to the seats 71a. No particular step of connecting the plate 410 to the ground must be carried out, which simplifies the assembling of the housing 4.

Figure 28:
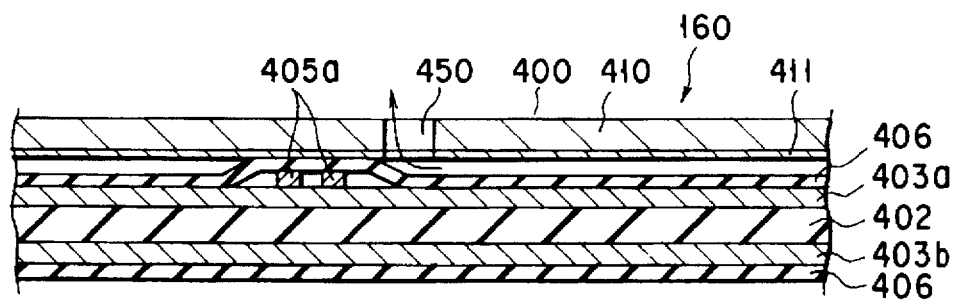
FIG. 28 is a sectional view illustrating a modification of the part-mounting portion.

FIG. 28 illustrating a modification of the extension circuit board 160. The modified extension circuit board is characterized in that ventholes 450 are made in the reinforcing plate 410 only. Excerpt for this point, the modification is identical to the extension circuit board 160. The ventholes 450 are located in the corners 408 defined by signal lines 405a. They reach the interface between a protective film 406 and an adhesive layer 411.

In the modified extension circuit board shown in FIG. 28, air is expelled outside through the ventholes 450 from the space between the protective film 406 and the reinforcing pale 410, as indicated by the arrow shown in FIG. 28,—when the film 406 and the plate 410 are pressed together and also when the subsequent solder-reflow process is performed. Since no air stays at the interface between the protective film 406 and the reinforcing pale 410, the reinforcing plate 410 will not come off. The extension circuit board 160 remains intact and reliable.

Figure 29:
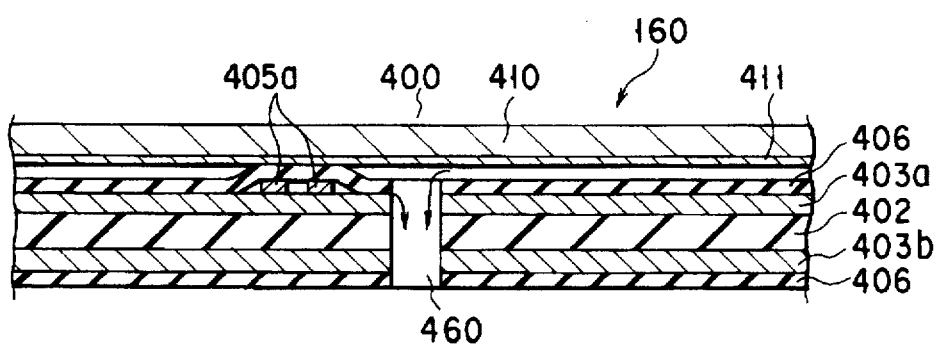
FIG. 29 is a sectional view showing another modification of the part-mounting portion.

FIG. 29 illustrating another modification of the extension circuit board 160. This modified extension circuit board is characterized in that ventholes 460 are made in the insulating plate 402, but not in the reinforcing plate 410. In all other respects, the modification is identical to the extension circuit board 160. The ventholes 460 are located in the corners 408 defined by signal lines 405a. They open at the surface of the protective film 406 and reach the interface between the protective film 406 and the reinforcing plate 410.

In the modified extension circuit board shown in FIG. 29, air is expelled outside through the ventholes 460 from the space between the protective film 406 and the reinforcing pale 410 and from the space between the film 406 and the insulating plate 402, as indicated by the arrows shown in FIG. 29—when the film 406 and the plate 410 are pressed together and also when the subsequent solder-reflow process is performed. Since no air remains at the interface between the protective film 406 and the reinforcing pale 410 or at the interface between the film 406 and the insulating plate 402, the reinforcing plate 410 will not come off. The extension circuit board 160 therefore as reliability.

The flexible printed circuit board, which is the main component of the extension circuit board 160, may have two or more insulating plates, not only one insulating plate 402 as in those shown in FIGS. 25, 28 and 29. Furthermore, the reinforcing plates or plates may be made of other material other than stainless steel. For example, they may be aluminum pates or zinc-plated copper plates.

As is shown in FIGS. 12 and 18, the FDD-supporting section 71 has a battery receptacle 169 and a speaker receptacle 170 in the lower surface of its bottom wall 75. An RTC (Real Time Clock) battery 171 is removably set in the battery receptacle 169. A cable 172 connects the RTC battery 171 to a connector 173. The connector 173 is removably secured to the extension circuit board 160. Set in the speaker receptacle 170 is a speaker 175 which is connected by a cable 176 to a connector 177. This connector 177 is removably connected to the extension circuit board 160.

A speaker holder 180 is secured to the lower surface of the bottom wall 75 by screws 161, along with the reinforcing plate 410. The speaker holder 180 is made of formed metal plates; it covers the battery receptacle 169 and the speaker receptacle 170 from under, and holds the RTC battery 171 removably in the receptacle 169 and the speaker 175 removably in the receptacle 170. The speaker holder 180 has slits 181 in the portion facing the speaker 175, for the passage of the sound generated by the speaker 175.

As seen from FIGS. 12 and 17, an extension connector 183 is fastened by screws to the right-side wall 74b of the FDD-supporting section 71. This connector 183 is used to electrically connect a track ball to the portable computer 1. A flexible circuit board 184 is connected to the extension connector 183, which in turn is removably connected to the extension circuit board 160. As a result, the second card receptacle 135, the third card receptacle 163 and the extension connector 183 are arranged in a line in the depthwise direction of the lower housing 5.

Figure 15:
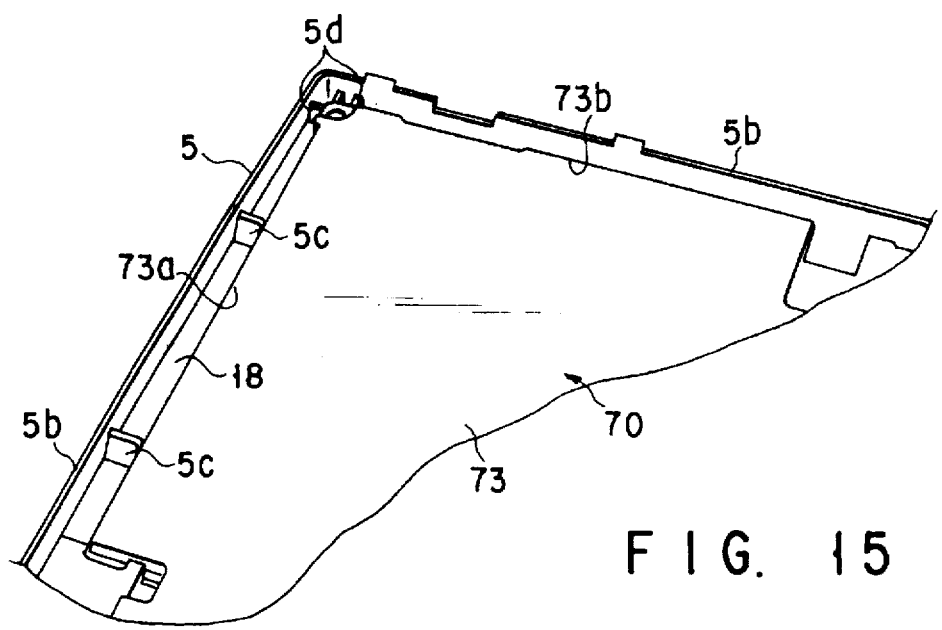
FIG. 15 is a perspective view, showing a corner portion of the lower housing and that portion of the frame which is fitted in the corner portion of the lower housing.
Figure 16:
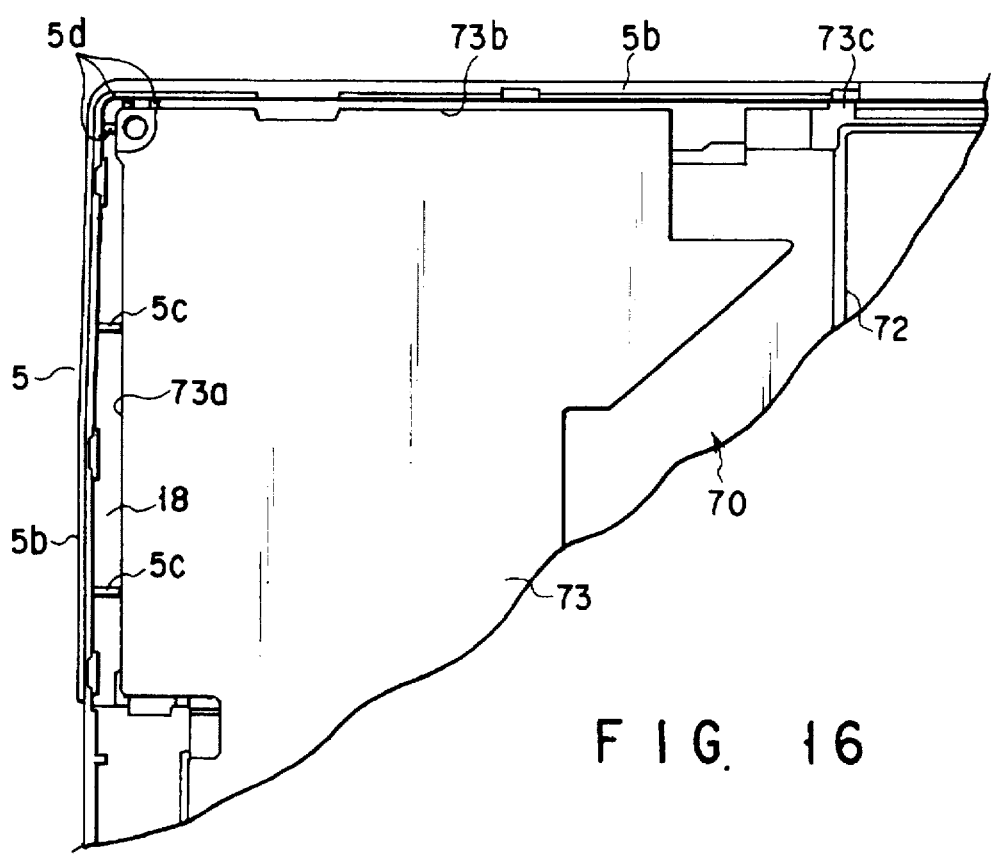
FIG. 16 is a plan view showing the corner portion of the lower housing and said portion of the frame.

The frame 70, to which the FDD 50, the boards 60a to 60d and 160 and the various connectors are mounted, is contained is placed in the lower housing 5. As shown in FIG. 2, the keyboard-supporting section 73 of the frame 70 is laid upon the top wall 18 of the battery receptacle 15. The keyboard-supporting section 73 has a front edge portion and a left edge portion 73b as seen from in FIGS. 13 and 14. The front edge portion 73a and the left edge portion 73b oppose the inner front surface and inner left surface of the lower housing 5, respectively. As shown in FIG. 15, projections 5c are formed in the corner defined by the front wall of the lower housing 5 and the top wall 18 of the battery receptacle 15. These projections 5c are spaced apart in the widthwise direction of the lower housing 5. They abut on the front edge portion 73a of the keyboard-supporting section 73. Projections 5d are formed in the corner defined by the front wall and left-side wall of the lower housing 5. These projections 5d abut on the corner of the keyboard-supporting section 73, which is defined by the front edge portion 73a and the left edge portion 73b. As shown in FIGS. 16 and 18, a projection 73c is formed integral with the left edge portion 73b of the keyboard-supporting section 73. The projection 73c abuts on the left-side wall of the lower housing 5.

The projections 5c, 5d and 73c serve to position the frame 70 with respect to the lower housing 5 when the frame 70 is fitted into the lower housing 5. Since the projections 5c and 5d abut on the front edge portion 73a and left edge portion 73b of the keyboard-supporting section 73, and the projection 73c abuts on the left-side wall of the lower housing 5, they prevent the front and left side of the lower housing 5 from bending or warping.

The frame 70, thus positioned in the lower housing 5, is fastened to the bottom wall 5a by screws—at the front edge of the bottom wall 75 of the FDD-supporting section 71, the front-let portion of the board-supporting section 72 and the rear edge of the board-supporting section 72. After the frame 70 has been fitted in the lower housing 5, the upper housing 6 is placed on the lower housing 5.

As shown in FIGS. 3 and 13, a plurality of hollow cylindrical bosses 185 protrude from the bottom wall 5a of the lower housing 5 and located in vertical alignment with the bosses 83 of the board-supporting section 72. The bosses 185 open at the lower surface of the bottom wall 5a. Their tops contact the lower surface of the second shield plate 101. A plurality of bosses 186 protrude from the inner surface of the top wall 6a of the upper housing 6 and located in vertical alignment with the bosses 83 of the board-supporting section 72. Nuts 187 made of metal are embedded in the bosses 186. The lower ends of the bosses 186 contact the first shield plate 100. Hence, the frame 70 is clamped between the bosses 185 and 186.

The lower housing 5 and the upper housing 6 are fastened together by screws 196 made of metal which pass through the bosses 83 and also through the circuit boards 60a and 60b and which are set in engagement with the nuts 187 embedded in the bosses 186. The frame 70 is thereby clamped between the housing 5 and 6. Since the screws 196 pass through the circuit boards 60a and 60b, they fasten the circuit boards 60a and 60b to the board-supporting section 72. Once the frame 70 is thus secured to the housing 4, the first shield plate 100, which is electrically connected to the first circuit board 60a, contacts the nuts 187. The frame 70 is therefore grounded to the housing 4 by the first shield plate 100.

Once the lower housing 5 and the upper housing 6 have been connected together, the edges of the keyboard body 157 are clamped between the keyboard-supporting section 73 and the top wall 6a of the upper housing 6 (more specifically, that portion of the top wall 6a which surrounds the rectangular opening 7). The keyboard 155 is thereby secured to the housing 4, and the keys 156 are arranged in the rectangular opening 7 of the top wall 6a.

As long as the frame 70 is fixed in position in the housing 4, the interface connectors 64 are arranged within the lower housing 5 and along the rear side thereof. As shown in FIGS. 12 and 13, the rear-side wall of the lower housing 5 has openings 188. The interface connectors 64 are exposed through these openings 188. As seen in FIG. 4, a first connector cover 189a and a second connector cover 189b are removably fitted in the openings 188, closing the openings 188.

Figure 31:
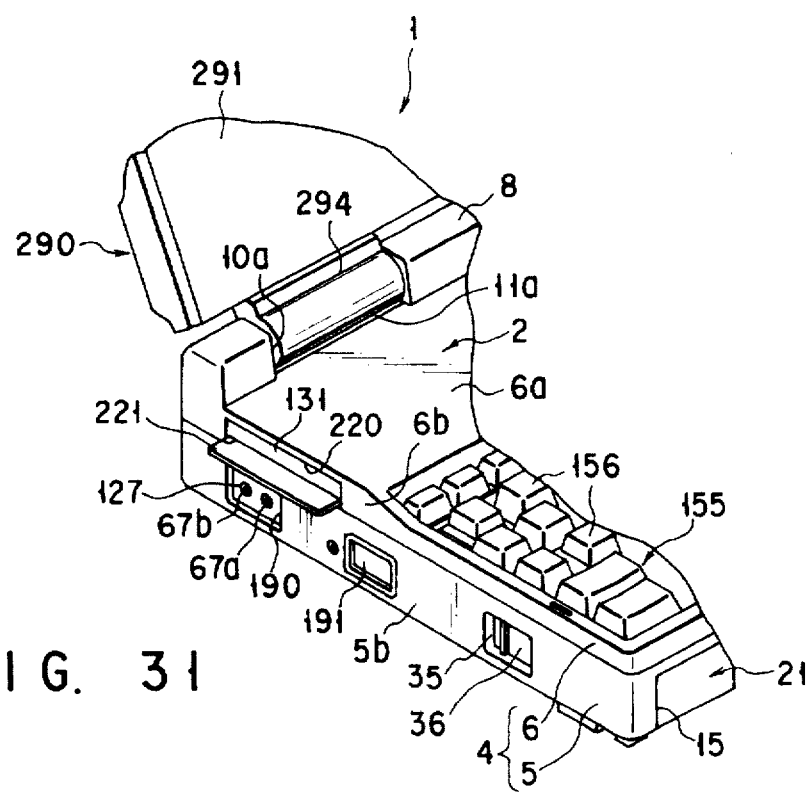
FIG. 31 is a perspective view of the left part of the portable computer.

As shown in FIG. 31, the jacks 67a and 67b and the wall 127, which are located at the left end of the frame 70, are arranged in the lower housing 5 and near the left-side wall thereof. The left-side wall of the lower housing 5 has an opening 190, which exposes that portion of the wall 127 which has holes 128a and 128b. The jacks 67a and 67b are therefore exposed through the holes 128a and 128b and the opening 190.

A power-supply switch 191 is arranged in the left-side wall of the lower housing 5. The switch 191 is located between the insertion hole 35 and the opening 190. The second card receptacle 135, the third card receptacle 163 and the extension connector 183 are arranged in the lower housing 5 and along the right-side wall thereof. As shown in FIG. 32, the right-side wall of the housing 5 has two card ports 192 and 193 which communicate with the card receptacles 135 and 163, respectively. The right-side wall also has an opening 194 which exposes the extension connector 183. The card ports 192 and 193 and the opening 194 are arranged in the depthwise direction of the lower housing 5.

A connector cover 198 is hinged to the lower housing 5. The cover 198 can be rotated between two positions. It closes the opening 194 when rotated to the first position, and opens the opening 194 when rotated to the second position. As shown in FIG. 32, the connector cover 198 enters the space between the extension connector 183 and the bottom wall 5a of the lower housing 5 when it is rotated to the second position.

Figure 30:
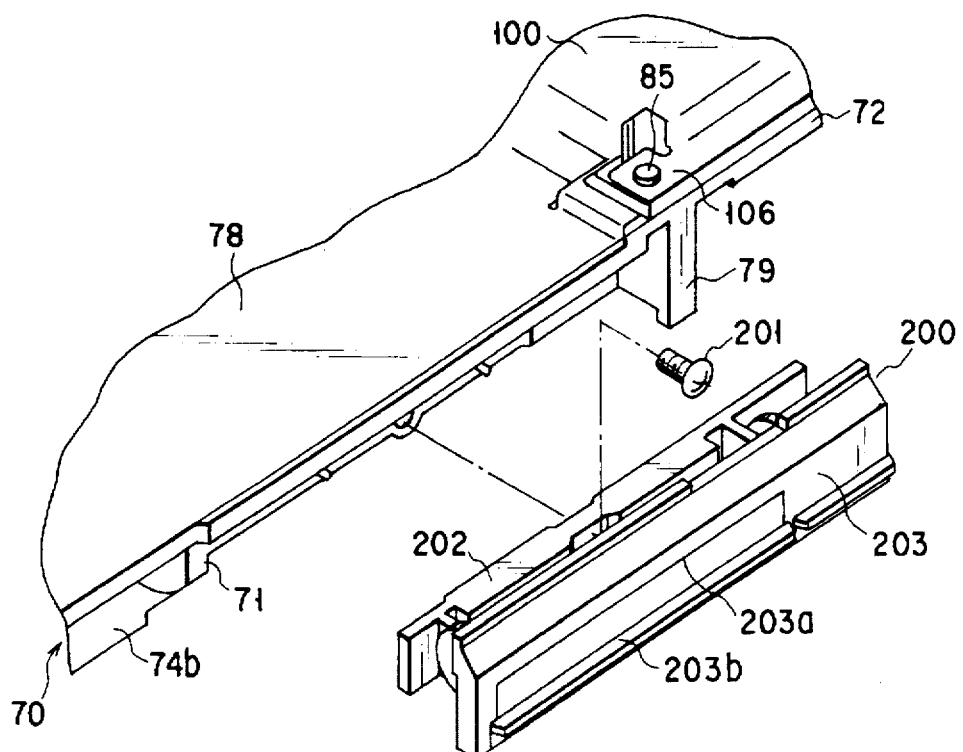
FIG. 30 is an exploded view for explaining how to fastening an extension connector to the frame.

The card port 193 is closed by a cover 200 and can be opened by rotating the cover 200. As shown in FIGS. 30 and 32, the cover 200 comprises a bracket 202 and a rectangular cover plate 203. The bracket 202 is fastened by a screw 201 to the right-side wall 74b of the FDD-supporting section 71. The cover plate 203 is rotatably held by the bracket 202. The plate 203 can rotate between two positions. When rotated to the first position, the plate 230 closes the third card port 193; when rotated to the second position, it is located above the bracket 202, opening the third card port 193. The cover plate 203 has a cable-guiding hole 203a and an auxiliary cover 203b for closing and opening the hole 203a. The cable-guiding hole 203a communicates with the card port 193 and hence with the third card receptacle 163. The auxiliary cover 203b is hinged to the cover plate 203 and can be rotated between two positions. When rotated to the first position, the cover 203b closes the cable-guiding hole 203a; when rotated to the second position, it opens the hole 203a. Therefore, a cable connected to the extension card 416 (e.g., an interface card), which is already inserted into the third card receptacle 163, can be pulled out of the housing 4 through the cable-guiding hole 203a, by rotating the auxiliary cover 203b to the second position.

The card port 192 is closed by a card cover 204 which is removably fitted in the port 192. When the cover 204 is removed from the port 192, opening the card port 182, the extension card 136 can be inserted into the second card receptacle 135 and removed therefrom.

As shown in FIG. 33, a card stopper 208 is attached to the right side of the lower housing 5, for preventing the extension card 136 from slipping out of the second card receptacle 135. The stopper 218 can slide back and forth between a first position where it protrudes into the card port 192 and a second position where it retreats from the port 192.

The card stopper 208 will be described in more detail, with reference to FIG. 34. As shown in FIG. 34, the card stopper 208 comprises a finger rest 209 and an engagement member 210, which are made of synthetic resin and integral with each other. The finger rest 209 is a rectangular plate. The member 210 extends from one side of the finger rest 209. The finger rest 209 has a pair of projections 211a and 211b. The projections 211a and 211b extend parallel and spaced part in the vertical direction. The projections 211a and 211b have tapered heads 212a and 212b. The upper projection 211a has a ridge 213a on its upper surface, and the lower projection 211b has a ridge 213b on its lower surface.

As seen from FIGS. 33 and 35A, the lower housing 5 has a recess 214 in its right side. Slidably fitted in this recess 214 is the finger rest 209. The recess 214 is contiguous at one end with the card port 192. The bottom of the recess 214 has a hole 215, in which the projections 211a and 211b can be removably fitted. As shown in the enlarged view of FIG. 35B, arcuate stoppers 215a and 215b bulge from the upper and lower rims of the hole 215 toward the axis of the hole 215. The ridge 213a of the upper projection 211a and the ridge 213b of the lower projection 211b are pressed onto the stoppers 215a and 215b, respectively. The stopper 215a has at its ends lock members 216a and 216b, and the stopper 215b has at its ends lock members 217a and 217b. The lock members 216a, 216b, 217a and 217b are broader than the stoppers 215a and 215b.

When the card stopper 208 is moved to the first position, the ridges 213a and 213b enter the lock members 216a and 217b, slipping over the stoppers 215a and 215b. Conversely, when the card stopper 208 is moved to the second position, the ridges 213a and 213b enter the lock members 216b and 217b, slipping over the stoppers 215a and 215b. The card stopper 208 is thereby held at either the first position and the second position, and the user can feel that the card stopper 208 has just reached the first position or the second position.

when the card stopper 208 is slid to the first position as shown in FIG. 35B, while an external device remains connected to the extension card 136 set in the second card receptacle 135, the engagement member 210 of the card stopper 208 projects into the card port 192. The engagement member 210 is thereby set into engagement with the rear edge of the extension card 136. The member 210 therefore prevents the extension card 136 from being pulled from the second card receptacle 135 when the connection terminal 137b of the card 136 is disconnected from the external device.

A stopper piece 218 protrudes from the rim of the hole 215. This stopper piece 218 slips into the gap between the projections 211a and 211b when the card stopper 208 is slid to the first position. Once slipped into the gap, the stopper piece 218 prevents both projections 211a and 211b from being bent or deformed even if a force is exerted on the projections 211a and 211b to push them out of the hole 215. The head 212a of the projection 211a and the head 212b of the projection 211b therefore remain held by the stoppers 215a and 215b, respectively, preventing the card stopper 208 from falling moving out of the hole 215.

As seen in FIGS. 22 and 31, the first card receptacle 131 provided in the left-side portion of the frame 70 is located inside the left side of the upper housing 6. The left side of the upper housing 6 has a card port 220 communicates with the first card receptacle 131. The port 220 is closed by a card cover 221 and can be opened by rotating the card cover 221.

The speaker 175 supported by the frame 70 and the lever 153 of the ejector 150 oppose the bottom wall 5a of the lower housing 5. As shown in FIG. 4, the bottom wall 5a has a number of small holes 222 and an opening 223. The small holes 222 are provide for the passage of the sound generated by the speaker 175. The opening 223 exposes the lever 153. The lever 153 is operated at the lower surface of the housing 4 to drive the ejector 150.

As shown in FIG. 3, a sub-battery 225 is held within the raised section 8 of the upper housing 6. The sub-battery 225 supplies power for setting the computer 1 in resume mode.

As shown in FIG. 3, a hard disk receptacle 231 is provided in the housing 4. The receptacle 231 is located between the lower housing 5 and the frame 70, for containing a hard disk drive 230 (hereinafter called "HDD"). More precisely, the receptacle 231 is defined by the bottom wall 5a of the lower housing 5, the right-side wall 16b of the battery receptacle 15, the left-side wall 74a of the FDD-supporting section 71, the keyboard-supporting section 73, and the wall 79 of the board-supporting section 72.

As illustrated in FIG. 3, the wall 79 of the board-supporting section 72 is located at the rear end of the hard disk receptacle 231. As shown in FIGS. 12 and 19, the rear end of the hard disk receptacle 231 has a notch 88, through which the HDD connector 68 is exposed. A pair of positioning pins 232a and 232b protrude horizontally from the wall 79. The pins 232a and 232b are located on the left and right sides of the HDD connector 68, respectively.

As shown in FIG. 5, a hard disk port 233 opens partly in the front wall of the lower housing 5 and partly in the bottom wall 5a thereof. The port 233 faces away from the HDD connector 68; it is covered with a removable HDD cover 234. The HDD cover 234 comprises a front wall 235a, a bottom wall 235b and a right-side wall 235c connecting the walls 235a and 235b. As long as the HDD cover 234 covers the hard disk port 233, the front wall 235a remains flush with the front of the lower housing 5, the bottom wall 235b remains flush with the lower surface of the lower housing 5, and the right-side wall 235c remains contiguous with the right-side wall 16b of the battery receptacle 15. A tongue 236 horizontally projects from the upper end of the right-side wall 235c and fitted in a notch 237 cut in the top wall 18 of the battery receptacle 15. The notch 237 exposes a part of the keyboard-supporting section 73. The section 73 has a screw hole 73e which is vertically aligned with the notch 237. An engagement member 238 is provided on the bottom all 235b of the HDD cover 234. The member 238 faces away from the tongue 236 and can be fitted into an engagement hole 239 made in the rim of the hard disk port 233.

To secure the HDD cover 234 to the lower housing 5, the engagement member 238 is inserted into the engagement hole 239, and the tongue 236 is fitted into the notch 237. Then, a screw 240 is driven through the tongue 236 into a screw hole 73e made in the frame 70. The HDD cover 234 is thereby fastened to the lower housing 5. The tongue 236 and the screw 240 are covered up when the battery pack 21 is set in the battery receptacle 15.

Figure 37:
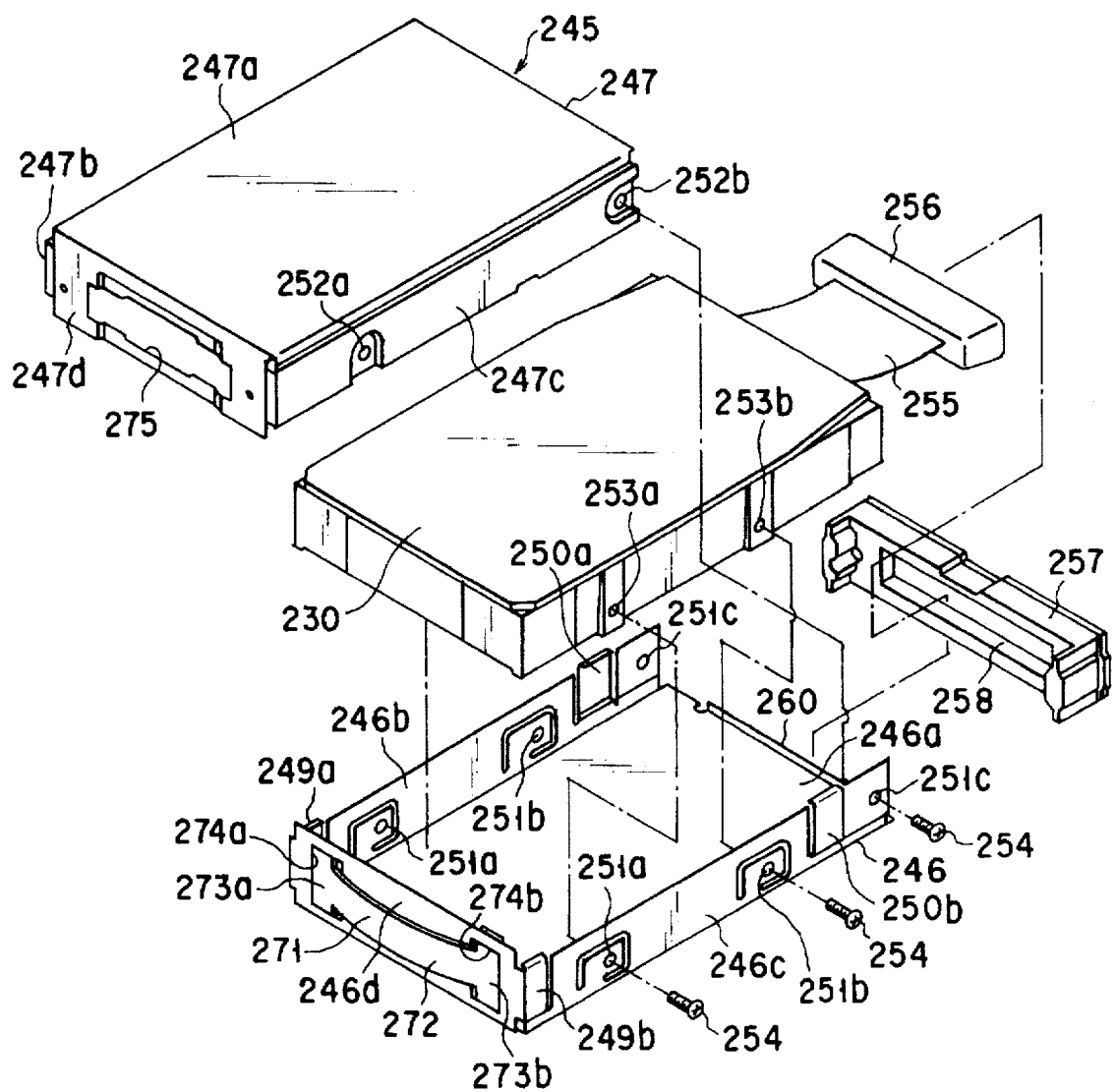
FIG. 37 is an exploded view showing the HDD and the protective case for containing the HDD.

As shown in FIG. 37, the HDD 230 is contained in a metal protective case 245. The protective case 245 is a rectangular box. It is made up of a lower half 246 and an upper half 247. The lower half 246 comprises a bottom wall 246a, two side walls 246b and 246c connected to the left and right edges of the bottom wall 246a, and a front wall 246d connected to the front edge of the bottom wall 246a. The upper half 247 comprises a top wall 247a, side walls 247b and 247c connected to the left and right edges of the top wall 247a, a front wall 247d connected to the front edge of the top wall 247a. The HDD 230 is placed in the lower half 246. The upper half 247 is removably mounted on the lower half 246 such that the side walls 247b and 247c of the upper half 247 overlap the side walls 246b and 246c of the lower half 246 and the front wall 247d of the upper half 247 overlap the front wall 246d of the lower half 246, respectively. The protective cover 245 is open at its rear.

The side wall 246b of the lower half 246 has elastic members 249a and 250a, both protruding outwards and able to bend resiliently. Similarly, the side wall 246c of the lower half 246 has elastic members 249b and 250b, both protruding outwards and an able to bend resiliently. The members 249a and 250a are pressed onto the inner surface of the side wall 247b of the upper half 247, and the members 249b and 250b onto the inner surface of the side wall 247c, when the upper half 247 is mounted on the lower half 246. Hence, the elastic members 249a, 249b, 250a and 250b maintain the upper half 247 in connection with the lower half 247.

The side walls 246b and 246c of the lower half 246 each have three screw holes 251a, 251b and 251c, which are spaced apart in the depthwise direction of the protective case 245. Of these screw holes, the holes 251a and 251b, located closer to the front of the lower half 246 than the screw hole 251c, are axially aligned with the screw holes 253a and 253b made in the sides of the HDD 230. Screws are driven into these holes 253a and 253b through the holes 251a and 251b of the side walls 246b and 246c, whereby the HDD 230 and the lower half 246 are fastened together.

The side walls 247b and 247c of the upper half 247 each have two screw holes 252a and 252b, which are spaced apart in the depthwise direction of the protective case 245. These screw holes 252a and 252b are axially aligned with the screw holes 251a and 251c made in the sides of the lower half 246 when the upper half 247 is mounted on the lower half 246. The screws 254 pass through the screw holes 252a, and other screws 254 are driven into the screw holes 251c of the lower half 246 through the screw holes 252b of the upper half 247, whereby the lower half 246 and the upper half 247 are fastened together.

As shown in FIG. 37, a connector 256 is connected to the HDD 230 by a flexible wire-board 255. The connector 256 is held by a rubber holder 257, which is supported in the protective case 245. The holder 257 has a connector hole 258, in which the connector 256 is fitted. The holder 257 is held at the open end of the protective case 245. As shown in FIG. 40, an engagement groove 259 is formed in the lower surface of the holder 257, which is set in contact with the rear end portion of the bottom wall 246a of the lower half 246. An engagement member 260, formed integral with the bottom wall 246a, extends upwards from the rear end thereof and inserted in the engagement groove 259. The holder 257 is therefore held in the protective case 245, closing the open end thereof.

Figure 38:
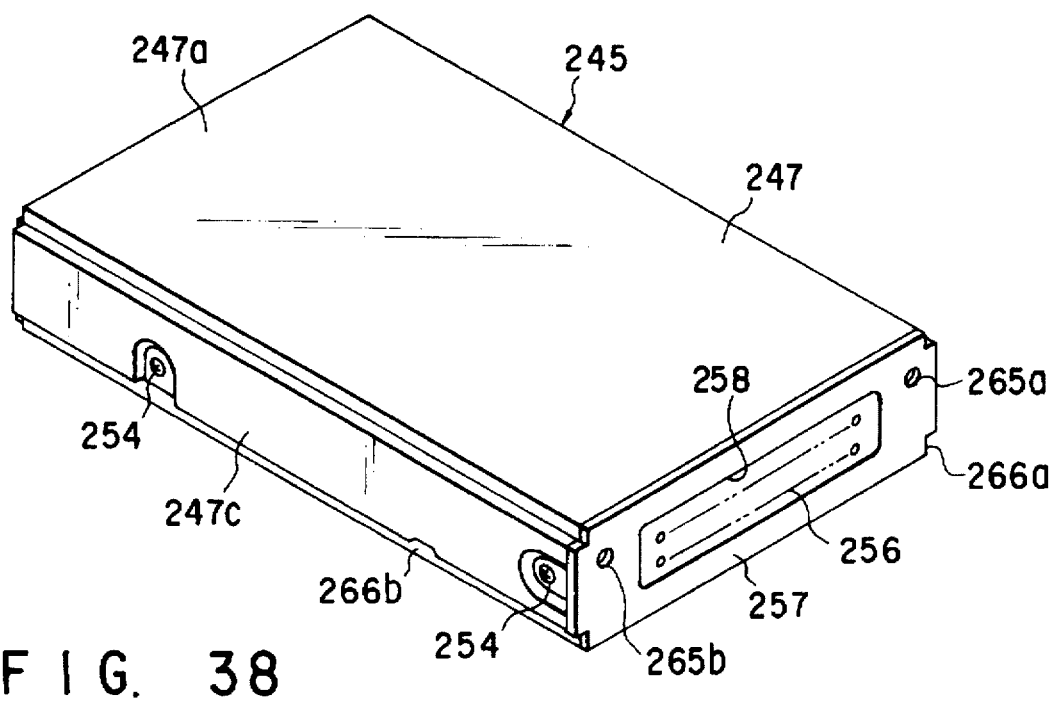
FIG. 38 is a perspective view of the protective case, seen from the connector side.

As illustrated in FIG. 38, the holder 257 has two positioning holes 265a and 265b, each made in one end portion. The holes 265a and 265b are located on the left and right sides of the connector 256, respectively. The pins 232a and 232b protruding from the rear end of the hard disk receptacle 231 are inserted into these holes 265a and 265b when the HDD 230 is inserted into the receptacle 231, with the connector 256 first guided into the receptacle 231. The HDD connector 68 and the connector 256 can be thereby connected together, provided that the HDD 230 is inserted in a specified position.

As can be understood from FIGS. 38 and 41, a guide groove 266a is defined by the left-side wall 247b of the upper half 247 and the bottom wall 246a of the lower half 246. Similarly, a guide groove 266b is defined by the right wall 247c of the upper half 247 and the bottom wall 246a of the lower half 246. These grooves 266a and 266b extend in the lengthwise direction of the protective case 245. A pair of side rails 267a and 267b are laid on the bottom wall 5a of the lower housing 5, i.e., the lower surface of the hard disk receptacle 231 in which the protective case 245 is inserted. The guide rails 267a and 267b extend parallel to each other, from the hard disk port 233 of the hard disk receptacle 231 toward the HDD connector 68. These rails 267a and 267b are fitted into the side grooves 266a and 266b of the protective case 245 when the case 245 is inserted into the hard disk receptacle 231. As a result of this, the protective case 245 is positioned with respect to the hard disk receptacle 231.

Figure 39:
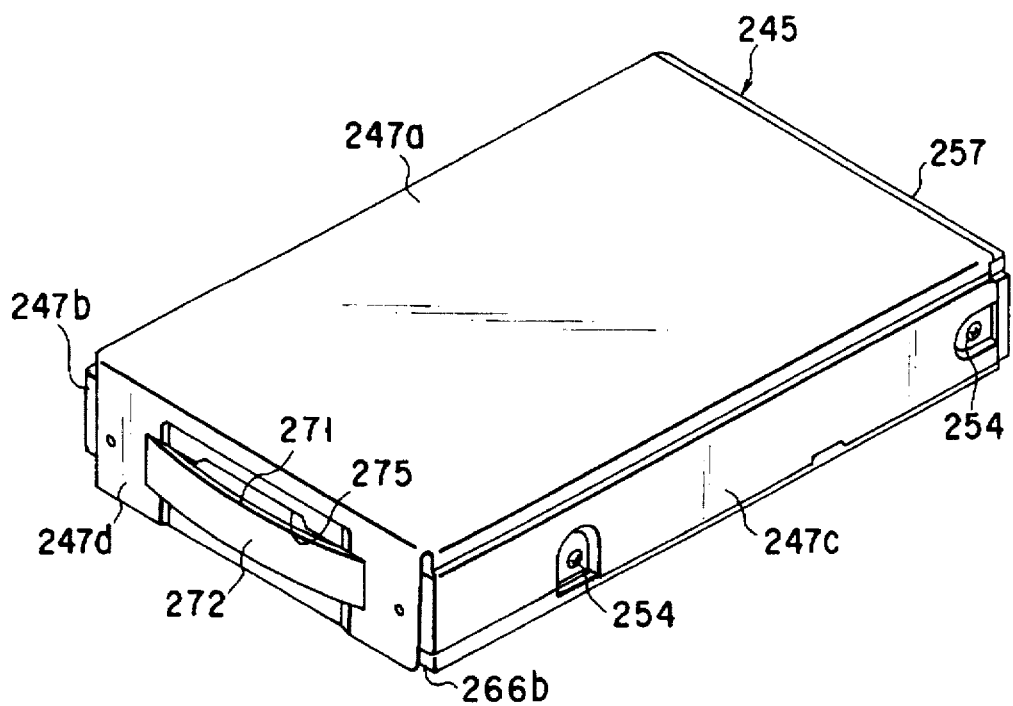
FIG. 39 is a perspective view of the protective case, seen from the handle side.

As shown in FIG. 39, a handle 271 is attached to the front of the protective case 245. The handle 271 is used by the user to pull the HDD 230 from the hard disk receptacle 231, along with the protective case 245. It is secured to the front wall 246a of the lower half 246 and the front wall 247d of the upper half 247. As shown in FIG. 37, the handle 271 has a finger rest 272 which is a thin belt and end portions 273a and 273b which are formed integral with the finger rest 272. The finger rest 272 and the end portions 273a and 273b are made of and elastic synthetic resin. The end portions 273a and 273b are broader than the finger rest 272, and the handle 271 is H-shaped as a whole.

The front wall 246d of the lower half 246 has engagement holes 274a and 274b, each in the end portion. The end portions 273a and 273b of the handle 271 are inserted in the holes 274a and 274b, each having its upper and lower edges abutting the rim of the engagement hole. The front wall 247d of the upper half 247 has an elongated hole 275 which extends horizontally. The elongated hole 275 opens to the front wall 246d of the lower half 246 and is located between the engagement holes 274a and 274b; it exposes the finger rest 272 of the handle 271. Both end portions 273a and 273b of the handle 271 are covered by the left and right end portions of the front wall 247d. The end portions 273a and 273b therefore abut on the rims of the engagement holes 274a and 274b, and held by the front wall 247d of the upper half 247. The protective case 245 is thereby held in place.

The finger rest 272 exposed through the elongated hole 275 remains almost straight, due to its own elastic force, and is substantially flush with the front wall 247d of the upper half 247. When the user pulls the finger rest 272, the finger rest 272 is arcuated, bulging outward from the protective case 245 through the elongated hole 275.

It will be now be explained how to attach the handle 271 to the protective case 245, with reference to FIGS. 42 and 43.

First, the lower half 246 and the upper half 247 are separated from each other, thereby exposing the engagement holes 274a and 274b of the lower half 246. Then, as shown in FIG. 42, the end portions 273a and 273b of the handle 271 are inserted, at one end, into the engagement holes 274a and 274b. In this stated, as shown in FIG. 43, the handle 271 is bent downward, until the end portions 273a and 273b are inserted, at the other end, into the engagement holes 274a and 274b. As a result, both end portions 273a and 273b slip into the upper and lower rims of the engagement holes 274a and 274b. The handle 271 is thereby provisionally secured to the lower half 246. Finally, the upper half 247 is placed over the lower half 246, and the left and right end portion of the front wall 247d hold the end portions 273a and 273b. The protective case 245 is thus assembled, and the handle 271 is attached to the protective case 245.

The handle 271 is secured to the lower half 246 by inserting its end portions 273a and 273b into the engagement holes 274a and 274b of the lower half 246. The end portions 273a and 273b have no projection, and the handle 271 can be made thin.

Once, the handle 271 has been attached to the protective case 245, the finger rest 272 remains within the elongated hole 275 of the upper half 247 and substantially flush with the front wall 274d of the upper half 274. Hence, the front wall of the protective case 245 is not thicker than the total thickness of the front walls 246d and 247d, despite that the handle 271 is located on the front of the protective case 245. Since its front wall is relatively thin, the protective case 245 is comparatively short.

To incorporate the HDD 230 into the protective case 245, the connector 256 of the HDD 230 is fitted into the connector hole 258 of the holder 257. Next, the holder 257 is mounted on the bottom wall 246a of the lower half 246. The engagement member 260 is inserted into the engagement groove 259, whereby the holder 257 is positioned with respect to the lower half 246. The HDD 230 is then set within the lower half 246. Thereafter, the screws 254 are driven into the screw holes 253b through the screw holes 251b made in the side walls 246b and 246c, whereby the HDD 230 is provisionally fastened to the lower half 246. Then, the upper half 247 is mounted on the lower half 246. The screws 254 are driven into the other screw holes 253a of the HDD 230 through the screw hole 252a of the upper half 247 and the screw hole 251a of the lower half 256. The front portion of the upper half 247 is fastened to the lower case 246, together with the HDD 230. At last, the screws 254 are further driven into the screw holes 251c through the holes 252b, thereby coupling the rear portion of the upper half 247 to the rear portion of the lower half 246. The HDD 230 is thereby held between the lower half 246 and the upper half 247. The HDD 230 is thus incorporated into the protective case 245.

Referring back to FIG. 1, the frame 70 in the lower housing 5 supports a display unit 290. The display unit 290 is provided to display the data input by operating the keyboard 155 or the data stored in the FDD 50 or the HDD 230. The unit 290 comprises a box-like housing 291 and a liquid crystal display 292 contained in the housing 291. The housing 291 has an opening 293, which exposes the liquid crystal display 292.

Figure 47:
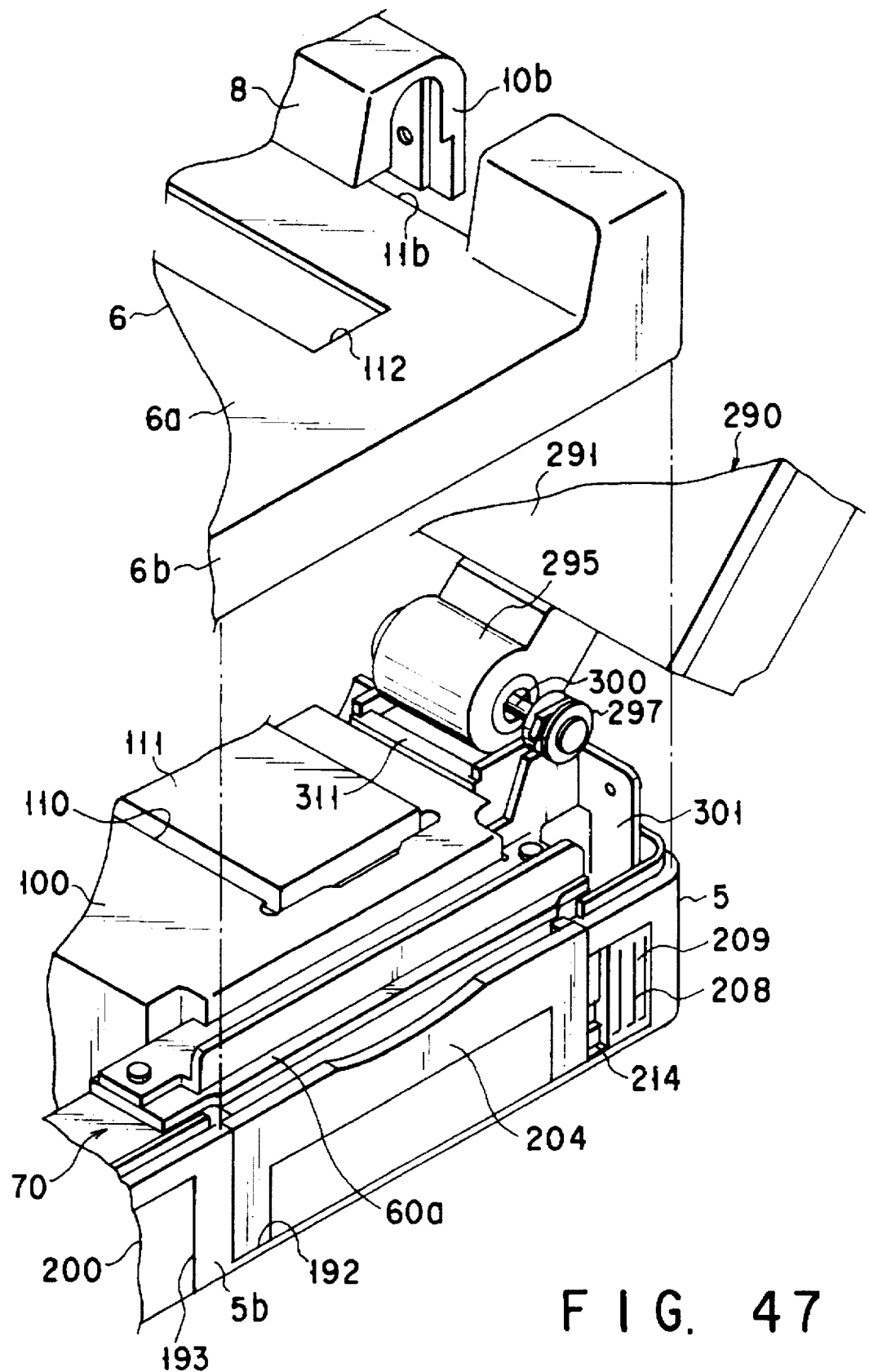
FIG. 47 is an exploded view of the right-rear part of the computer, showing how the upper housing is mounted on the lower housing.

The housing 291 has a first leg 294 and a second leg 295. The legs 294 and 295 are inserted into the leg-holding recesses 10a and 10b of the upper housing 6, and connected to the frame 70 by first and second hinge mechanisms 296 and 297, respectively. The first hinge mechanism 296 has a hinge shaft 298 protruding from the left side of the first leg 294. The hinge shaft 298 is fastened to a bracket (not shown) contained in the first leg 294. The outward end portion of the shaft 298 is rotatably supported by a coupling bracket 299. As seen in FIG. 47, the second hinge mechanism 297 has a hinge shaft 300 protruding from the right side of the second leg 295. The hinge shaft 300 is fastened to a bracket (not shown) contained in the second leg 295. The outward end portion of the hinge shaft 300 is rotatably supported by a coupling bracket 301.

As shown in FIG. 2, the brackets 299 and 300 are fastened to the rear end of the frame 70 by means of screws. The display unit 290 can rotate around the hinge shaft 298 of the first hinge mechanism 296 and the hinge shaft 300 of the second mechanism 297, to assume three positions. In the first position, the unit 290 covers the keyboard 155 from above. In the second position, the unit 290 stands upright so that the display 292 faces the user of the computer 1. In the third position, the unit 290 is tilt backward, extending from the rear end of the housing 4, almost in the horizontal direction. While the display unit 290 remains in the first position as shown in FIG. 4, the housing 291 has its upper surface located flush with the raised section 8 of the housing 4, and its front, left and right sides placed in level with those of the housing 4. In this state, the base unit 2 and the display unit 290 form a rectangular box, and the computer 1 is compact and quite portable.

As illustrated in FIG. 2, the first leg 294 has a cable-guiding hole 303 which opens at the left side of the leg 294. A cable 304 is connected at one end to the drive circuit (not shown) incorporated in the liquid crystal display 292 and is led into the first leg 294 at the right side thereof. The other end of the cable 304 led into the raised section 8 through the left side of the leg-holding recess 10a and is connected to a connector 305. The connector 305 is connected to the connector 62a arranged on the first circuit board 60a.

As shown in FIG. 45, the opening 11a of the leg-holding recesses 10a opposes the first shield plate 100. The shield plate 100 has a cover seat 307 on its portion which opposes the opening 11a. As shown in FIG. 46, the opening 11b of the leg-holding recesses 10b opposes the board-supporting section 72 of the frame 70. The board-supporting section 72 has a cover seat 308 on its portion which opposes the opening 11b. Positioning holes 309a and 309b are made in the upper surfaces of the cover seats 307 and 308, respectively.

A first cover 310 and a second cover 311 are attached to the cover seats 307 and 308, covering the openings 11a and 11b, respectively. Projections 312a and 312b protrude downwards from the lower surfaces of the covers 310 and 311. The projections 312a and 312b are inserted into the positioning holes 309a and 309b when the covers 310 and 311 are mounted on the cover seats 307 and 308. The first cover 310 and the second cover 311 are thereby positioned with respect to the first and second cover seats 307 and 308. The covers 310 and 311 are clamped between the rims of the openings 11a and 11b of the upper housing 6 and the first and second cover seats 307 and 308, when the upper housing 6 is mounted on the lower housing 5. Once so clamped, both covers 310 and 311 are flush with the upper wall 6a of the upper housing 6.

It will now be explained how the computer 1 is assembled.

First, as shown in FIG. 12, the frame 70 is turned upside down, turning upwards the stepped portion 80b of the board-supporting section 72. The cover 140 is then provisionally coupled to the board-supporting section 72 by screws 146. Then, the fourth circuit board 60d is connected to the second circuit board 60b by a stacking connector, fitting the board 60b in the stepped portion 80b of the board-supporting section 72. Thereafter, the second shield plate 101 is placed on the second circuit board 60b, and the tongues 124 of the shield plate 101 are fastened to the board-supporting section 72 by the screws 87, together with the second circuit board 60b.

Next, the RTC battery 171 and the speaker 175 are connected to the extension circuit board 160 by means of the connectors 173 and 177, respectively. Further, the relay connectors 437a and 437b are connected to the relay connectors 69a and 69b, respectively, which are mounted on the second circuit board 60b. The RTC battery 171 and the speaker 175 are fitted into the battery receptacle 169 and the speaker receptacle 170, respectively. The extension connector 183 fastened to the side wall 74b of the FDD-supporting section 71 by screw, and the circuit board 184 of extension connector 183 is connected to the extension circuit board 160.

Then, the speaker holder 180 is placed on the bottom wall 75 of the FDD-supporting section 71 and fastened to the bottom wall 75 by screws 161, along with the extension circuit board 160. Both the RTC battery 171 and the speaker 175 are thereby held by the frame 70.

Next, the frame 70 is turned downside up, into a normal position, as shown in FIG. 11. The FDD 50 is fitted into the FDD-supporting section 71 from above and secured by screws to the left-side wall 74a and right-side wall 74b of the FDD-supporting section 71. At the same time, the FDD 50 is connected to the FDD connector mounted on the second circuit board 60b, and the shield plate 78 is mounted on the FDD 50. Then, the third circuit board 60c is connected by a stacking connector to the lower surface of the first circuit board 60a, which is fitted into the stepped portion 80a of the board-supporting section 72.

Now that the circuit boards 60a to 60d and the functional components, such as the FDD 50 and the RTC battery 171, have been arranged and mounted on the frame 70, the frame 70 is fitted into the lower housing 5. The first shield plate 100 is mounted on the first circuit board 60a which is exposed at the upper edges of the board-supporting section 72. Then, the hinge mechanisms 296 and 297 of the display unit 190 are guided to the left and right end portions of the first shield plate 100. In this state, the coupling bracket 299 of the first hinge mechanism 296 and the coupling bracket 301 of the second hinge mechanism 197 are fastened by screws 85 to the left and right ends of the board-supporting section 72, along with the first circuit board 60a.

Then, as shown in FIG. 2, the cable 304 led from the first leg 294 of the display unit 290 is guided to the rear end of the first shield plate 100. The connector 305 on the distal end of the cable 304 is connected to the connector 62a exposed through the connector hole 107a as illustrated in FIG. 17. Similarly, the connector 118 on the liquid-crystal display panel 111 is connected to the connector 62b exposed through the connector hole 107b. The microphone 114 is connected by the connector 120 to the connector 62c located adjacent to the connector 62b. Then, the display panel 111 is fitted in the elongated recess 110 of the first shield plate 100, and the holder 115 holding the microphone 114 is inserted into the support members 113 of the first shield plate 110. The first cover 310 is put on the first cover seat 307 of the first shield plate 100, and the second cover 311 is placed on the second cover seat 308 of the board-supporting section 72. Furthermore, the keyboard 155 is mounted on the keyboard-supporting section 73 and connected to the first circuit board 60a by the keyboard connector 63.

Thereafter, as shown in FIG. 47, the display unit 290 is rotated to the third position which is behind the lower housing 5. Then, the upper housing 6 is mounted on the lower housing 5, setting that the rim of the upper housing 6 into engagement with the rim of the lower housing 5. The upper housing 6 covers the frame 70, and the legs 294 and 295 of the display unit 290 are inserted into the leg-holding recesses 10a and 10b of the upper housing 6. At this time, the first cover 310 and the second cover 311 close the openings 11a and 11b of the leg-holding recesses 10a and 10b, respectively. When the upper housing 6 is secured to the lower housing 5, the edges of the keyboard body 157 and the edges of the reinforcing plate 158 are clamped between the upper housing 6 and the frame 70. As a result, the keyboard 155 is positioned with respect to the housing 4.

Then, the display unit 290 is rotated from the third position to the first position, and the housing 4 is turned upside down as shown in FIG. 4. The screws 196 are driven into the bosses 186 of the upper housing 6 from the lower surface of the lower housing 5, through the bosses 83 of the frame 70. The lower housing 5 and the upper housing 6 are thereby coupled together, clamping the frame 70. As a result, the portable computer 1 is assembled.

In the computer 1, the circuit boards 60a to 60d and the functional components, e.g., the FDD 50, the RTC battery 171 and the speaker 175, are supported altogether by the frame 70 which has substantially the same size as the lower housing 5. The circuit boards 60a to 60d and the functional components can therefore be incorporated into set within the housing 4 at a time, along with the frame 70. The computer 1 can be assembled easily, requiring no cumbersome operations of fastening these parts by screws, one by one, to the lower housing 5.

To remove the circuit boards 60a to 60d and the FDD 50 from the housing 4, whenever required, it suffices to disconnect the upper housing 6 from the lower housing 5 and release the frame 70 from the lower housing 5. The circuit boards 60a to 60d and the FDD 50 can then be removed, together with the frame 70, from the lower housing 5. Even if the boards 60a to 60d and the FDD 50 are located deep in the lower housing 5, the parts surrounding these boards and the FDD 50 need not be removed, one after another, to remove the boards 60a to 60d and the FDD 50 from the lower housing 5. This makes it easy to overhaul the portable computer 1, for inspection and maintenance purposes.

The lower housing 5 and the upper housing 6, both made of a synthetic resin, can easily be separated from the frame 70 and shield plates 100 and 101 which are made of metal. A relatively short time suffices to separate the resin parts from the metal parts in disposing the computer 1. This serves the environment preservation and promote the recycling movement.

Once the frame 70 has been removed from the lower housing 5, the circuit boards 60a to 60d can easily be disconnected from the lower housing 5. Neither a finger nor a tool needs to be inserted into the lower housing 5 to disconnect the boards 60a to 60d from the lower housing 5. The portable computer 1 can therefore be overhauled with high efficiency.

Further, since the circuit boards 60a to 60d and the functional components such as the FDD 50 are supported by one and the same frame 70, i.e., the bosses 185 and 186 of the lower housing 5 and the upper housing 6 only need to be aligned with some portions of the frame 70; they need not be aligned with any specific portions of the circuit boards 60a to 60d and those of the individual functional component (e.g.,.). The bosses 185 an 186 are far less than otherwise. The lower housing 5 and the upper housing 6 therefore have a simple internal structure and a flat bottom. The housing 4 can have a space large enough to accommodate components, without being enlarged.

In the embodiment described above, the screws 196 which fasten the housing 5 and 6 together pass through the bosses 83 of the frame 70, thus connecting the frame 70 to the housings 5 and 6. The number of screws required for securing the frame 70 to the lower housing 5 is thus reduced. This means a decrease in the number of parts of the computer 1, which results in a reduction in the manufacturing cost of the computer 1. In addition, since a few screws are used to fasten the housing 5 an 6 and the frame 70 together, it is easy to assemble the portable computer 1.

As indicated above, the circuit boards 60a to 60d and the functional components (e.g., the FDD 50, the RTC battery 171 and the speaker 175) are supported by the frame 70. In other words, their weights exert all on the frame 70, not at all on the lower housing 5 or the upper housing 6. It follows that the housings 5 and 6 need only to serve as covers for the frame 70. In particular, the lower housing 5 need not be so rigid or strong as its counterpart of the conventional portable computer. The walls of the housing 5 can be thin, lighting the computer 1 and increasing the space for accommodating the circuits boards 60a to 60d and the various functional components.

Since the load on the lower housing 5 is small, no problem arises in terms of the mechanical strength of the housing 5, despite of the many openings which are made in the front, rear and side walls of the housing 5 to expose the various connectors and card receptacles provided within the housing 4. The circuit boards 60a to 60d and the various functional components can be held firmly within the lower housing 5.

As described above, the frame 70 has a section 72 for supporting the first and second circuit boards 60a and 60b and another section 71 for holding the FDD 50. Therefore, the boards 60a and 60b and the FDD 50 are stable in position, firmly secured to the frame 70.

Moreover, the frame 70 supports not only the circuit boards 60a to 60e and the functional components, but also the keyboard 155 and the display unit 290. The keyboard 155 and the display unit 290 are electrically connected to the circuit boards 60a to 60d mounted on the frame 70 and can operate as integral parts of the computer 1. Hence, the computer 1 can be tested even before the frame 70 supporting the other components connected is incorporated into the housing 4 or even after they are removed from the housing 4. Should any trouble occur in the computer 1, the circuit boards 60a to 60d and the functional components can be easily exposed to be inspected, repaired or replaced.

As mentioned above, the frame 70 is made of magnesium alloy which is an electrically conductive material. The board-supporting section 72 of the frame 70 has a wall 79, which surrounds the first to fourth circuit boards 60a to 60d. The first circuit board 60a and the fourth circuit board 60d, which are secured to the upper and lower edge of the wall 79, are covered by the first shield plate 100 and the second shield plate 101, respectively. The shield plates 100 and 101 are electrically connected to the board-supporting section 72 by screws 85, 87 and 196. Since the circuit boards 60a to 60d are surround by metal members electrically connected together, the high-frequency noise emanating from circuit components 61 while the computer 1 is operating can be confined within the housing 4. The portable computer 1 causes no electric-wave interference on other apparatuses placed near The first circuit board 60a and the fourth circuit board 60d, which are fitted in the stepped portions 80a and 80b, respectively, each have a grounding wiring pattern 93 formed on their edge portions. These wiring patterns 93 contact the stepped portions 80a and 80b of the board-supporting section 72. As described above, the section 72 is electrically connected to the first shield plate 100 and the second shield plate 101. When the frame 70 is set in the housing 4, the first shield plate 100 is brought into contact with the nuts 187 embedded in the bosses 186 of the upper housing 6. The circuit boards 60a and 60d are thereby made to contact the frame 70, which in turn contacts the housing 4. No lead wires or no connectors are required to connect the circuit boards 60a and 60d to the ground.

Furthermore, the board-supporting section 72 has the wall 79 which surrounds the circuit boards 60a and 60b secured to the stepped portions 80a and 80b of the board-supporting section 72. Hence, pressure, if applied during the use of the computer 1 to compress the housing 4, exerts on the frame 70 made of metal, not on the circuit board 60a or 60b. The circuit boards 60a and 60b are therefore prevented from being broken. In addition, since the frame 70 supports the housing 4 from within, the housing 4 is not likely to be deformed.

This invention is not limited to the embodiment described above. Various changes and modifications can be made, without departing the scope and spirit of the present invention.

For example, the frame 70 is not limited to one made of a material other than magnesium alloy; it may be an injection molding of synthetic resin, which is plated with an electrically conductive material.

The portable electronic apparatus of the present invention is not limited to a book-type portable computer. Rather, it may be any other type of a dataprocessing apparatus such as a word processor.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable electronic apparatus having first, second and third functional components comprising:

a housing, comprised of a lower half having a bottom wall and a first wall extending upwardly from said bottom wall and an upper half removably connected to said lower half and having a top wall opposing said bottom wall, said first wall defining a first receptacle in the housing and surrounding therewith and supporting the first functional component; and a frame removably set within said housing, said frame having a second wall opposing said first wall inside said housing, said second wall defining a second receptacle in said housing and surrounding therewith and supporting the second functional component and defining a third receptacle in said housing along with the first wall and surrounding therewith and supporting the third functional component, said second and third receptacles being positioned side by side between said bottom wall of said lower half and said top wall of said upper half, said frame further including a wall having upper edges which oppose said top wall and lower edges which oppose said bottom wall, and the upper edges of said wall being projected more upwardly than said second and third receptacles and said lower edges of said wall being projected more downwardly than said second and third receptacles.

2. The electronic apparatus according to claim 1, further comprising:

a plurality of circuit boards incorporated in said housing, said circuit boards being supported by said frame.

3. The electronic apparatus according to claim 2, wherein said frame has a board supporting section for supporting said circuit boards, said board supporting section being positioned at the rear end of said first, second and third receptacles.

4. The electronic apparatus according to claim 2, wherein said circuit boards are positioned substantially in parallel with said bottom wall, spaced apart from one another in the height direction of said housing.

5. The electronic apparatus according to claim 4, wherein said frame is fastened to the bottom wall of said housing by screws, and said bottom wall has a plurality of bosses holding said screws.

6. The electronic apparatus according to claim 5, wherein some of said screws extend from the bottom wall of said lower half to the top wall of said upper half, fastening the lower and upper halves together.

7. The electronic apparatus according to claim 5, wherein said screws pass through said circuit boards, fastening said circuit boards to said frame.

8. The electronic apparatus according to claim 1, further comprising:

input means supported by said frame and electrically connected to said circuit boards, for inputting data; and a display unit supported by said frame and electrically connected to said circuit boards, for displaying data input by operating said input means.

9. A portable electronic apparatus having a functional component comprising:

a housing having a bottom wall, a peripheral wall contiguous with the bottom wall and a first wall extending upwardly from said bottom wall inside the peripheral wall;

a frame incorporated in said housing, the frame having a ceiling wall opposing said bottom wall and a second wall extending downwardly from the ceiling wall so as to oppose said first wall, said ceiling wall and said second wall comprising a receptacle defined in said housing along with said bottom wall and said first wall and surrounding therewith and supporting said functional component; and a keyboard supported by the ceiling wall of said frame.

10. The electronic apparatus according to claim 9, wherein the first wall of said housing comprises another receptacle in said lower half along with said peripheral wall, the another receptacle surrounding therewith and supporting another functional component.

11. The electronic apparatus according to a claim 10, wherein said frame has a third wall opposing said second wall and a bottom wall connecting the second wall and the third wall, said second, third and bottom walls comprising still another receptacle inside said housing, the receptacle surrounding therewith and supporting still another functional component.

12. The electronic apparatus according to claim 11, wherein said receptacles are arranged in a line in the width direction of said housing.

13. The electronic apparatus according to claim 9, further comprising:

a plurality of circuit boards incorporated in said housing, said circuit boards being supported by said frame.

14. The electronic apparatus according to claim 13, wherein said frame has a board supporting section for supporting said circuit boards, said board supporting section being positioned at the rear end of said receptacle.

15. The electronic apparatus according to claim 9, wherein said housing includes an upper half having an opening through which said keyboard is exposed to the outside of said housing.

16. The electronic apparatus according to claim 9, wherein said frame has a peripheral portion in which a plurality of projections abut on an inner surface of said peripheral wall, whereby said frame is fitted into said housing.

17. The electronic apparatus according to claim 16, wherein said peripheral wall of said housing has a plurality of projections abutting the peripheral portion of said frame.

* * * * *